(12) United States Patent
Govindan et al.

(10) Patent No.: US 11,371,355 B2
(45) Date of Patent: Jun. 28, 2022

(54) TURBINES AND ASSOCIATED COMPONENTS, SYSTEMS AND METHODS

(71) Applicant: Gradiant Corporation, Woburn, MA (US)

(72) Inventors: Prakash Narayan Govindan, Singapore (SG); Maximus G. St. John, Boston, MA (US); Swati Maini, Singapore (SG)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 17/394,730

(22) Filed: Aug. 5, 2021

(65) Prior Publication Data

US 2021/0363887 A1    Nov. 25, 2021

Related U.S. Application Data

(63) Continuation of application No. PCT/US2020/061456, filed on Nov. 20, 2020.

(60) Provisional application No. 62/939,242, filed on Nov. 22, 2019.

(51) Int. Cl.
*F01D 5/14* (2006.01)

(52) U.S. Cl.
CPC .................................... *F01D 5/141* (2013.01)

(58) Field of Classification Search
CPC ........................................................ F01D 5/141
See application file for complete search history.

(56) References Cited

U.S. PATENT DOCUMENTS

| | | | |
|---|---|---|---|
| 4,583,703 A | 4/1986 | Kline | |
| 4,904,219 A | 2/1990 | Cox | |
| 5,173,069 A * | 12/1992 | Litos | A63H 33/185 |
| | | | 446/36 |
| 5,505,650 A | 4/1996 | Harned | |
| 5,810,636 A | 9/1998 | Harned | |
| 6,443,792 B1 | 9/2002 | Forti et al. | |
| 6,974,309 B2 | 12/2005 | Seki | |
| 7,766,274 B1 | 8/2010 | Jameson et al. | |

(Continued)

FOREIGN PATENT DOCUMENTS

| | | |
|---|---|---|
| DE | 102011117176 A1 | 5/2013 |
| WO | WO 2011/095397 A2 | 8/2011 |

OTHER PUBLICATIONS

Invitation to Pay Additional Fees mailed on Jul. 30, 2021 in International Patent Application No. PCT/US2020/061456.

(Continued)

*Primary Examiner* — Michael L Sehn
(74) *Attorney, Agent, or Firm* — Wolf, Greenfield & Sacks, P.C.

(57) ABSTRACT

Turbines and associated components, systems, and methods are described. In some embodiments, the turbine blades and turbines are configured to convert kinetic energy present in fluid (e.g., water) to other forms of energy (e.g., in a hydrokinetic energy system in a river or ocean) relatively efficiently and/or at relatively low cut-in speeds. The turbine blades may have a shape and/or include structural features that contribute at least in part to relatively high efficiency and/or relatively low cut-in speeds. In some embodiments, the turbine blades have a geometry similar to the geometry of a maple seed.

74 Claims, 12 Drawing Sheets

(56) References Cited

U.S. PATENT DOCUMENTS

| | | |
|---|---|---|
| 8,801,386 B2 | 8/2014 | Keir et al. |
| 9,140,233 B2 * | 9/2015 | Watts .................... F03D 1/0675 |
| 9,199,718 B2 * | 12/2015 | Fogarty .................. A63H 33/18 |
| 2008/0265583 A1 | 10/2008 | Thompson |
| 2010/0324754 A1 | 12/2010 | Barrows |
| 2011/0123344 A1 | 5/2011 | Yerramalli et al. |
| 2011/0254271 A1 | 10/2011 | Freeman et al. |
| 2012/0013128 A1 | 1/2012 | Duke |
| 2012/0241346 A1 | 9/2012 | Wiest |
| 2012/0301299 A1 | 11/2012 | Sherrill et al. |
| 2012/0328441 A1 | 12/2012 | Fogarty |
| 2014/0037455 A1 | 2/2014 | Dahl et al. |
| 2015/0050146 A1 | 2/2015 | Dorweiler et al. |

OTHER PUBLICATIONS

[No Author Listed], Inclination Effects on Lift. Glenn Research Center NASA. May 13, 2021. https://www.grc.nasa.gov/www/k-12/airplane/incline.html# [last accessed Aug. 2, 2021].

Kumar et al., Development of Hydrokinetic Power Generation System: A Review. Int J Eng Sci Adv Technol. Nov. 2014;4(6):464-77.

Mertens, The difference between a lift and drag wind turbine explained. The Wind Challenge. Jan. 25, 2017. https://web.archive.org/web/20201025110744/https://windchallenge.com/2017/01/25/lift-versus-drag-wind-turbine/ [last accessed Aug. 2, 2021].

International Search Report and Written Opinion for International Application No. PCT/US2020/061456 dated Oct. 4, 2021.

Stol, Geometry and Structural Properties for the Controls Advanced Research Turbine (CART) from Model Tuning. Subcontractor Report. National Renewable Energy Laboratory. Sep. 2004;60 pages.

* cited by examiner

TURBINES AND ASSOCIATED COMPONENTS, SYSTEMS AND METHODS

RELATED APPLICATIONS

This application is a continuation of International Patent Application No. PCT/US2020/061456, filed Nov. 20, 2020 and entitled "Turbines and Associated Components, Systems, and Methods," which claims priority under 35 U.S.C. § 119(e) to U.S. Provisional Application No. 62/939,242, filed Nov. 22, 2019, and entitled "Turbines and Associated Components, Systems, and Methods," each of which is incorporated herein by reference in its entirety for all purposes.

TECHNICAL FIELD

Turbines, and associated components, systems, and methods are generally described.

BACKGROUND

Turbines can be used to generate power from fluids such as water and air. Hydroturbines can generate power from the kinetic energy of water, while wind turbines can generate power from the kinetic energy of air. Systems that generate power from water include dams, which require the creation of large reservoirs and the modification of existing ecosystems. Examples of moving bodies of water from which energy can be harnessed include rivers as well as larger bodies such as oceans. Certain embodiments of this disclosure are directed to inventive components, systems, and methods for improving the performance of turbines such as hydroturbines and wind turbines.

SUMMARY

Turbines and associated components, systems, and methods are described. In some embodiments, the turbine blades and turbines are configured to convert kinetic energy present in fluid (e.g., water) to other forms of energy (e.g., in a hydrokinetic energy system in a river or ocean) relatively efficiently and/or at relatively low cut-in speeds. The turbine blades may have a shape and/or include structural features that contribute at least in part to relatively high efficiency and/or relatively low cut-in speeds. In some embodiments, the turbine blades have a geometry similar to the geometry of a maple seed. The subject matter of the present invention involves, in some cases, interrelated products, alternative solutions to a particular problem, and/or a plurality of different uses of one or more systems and/or articles.

In one aspect, turbine components are described. In some embodiments, a turbine component comprises a turbine blade configured to be incorporated into a rotor of a turbine, the turbine blade comprising a distal end and a proximal end closer to an axis of rotation of the rotor than the distal end when the turbine blade is incorporated into the rotor, wherein at least 35% of the mass and/or volume of the turbine blade is within 25% of a distance from the proximal end to the distal end of the turbine blade.

In some embodiments, a turbine component comprises a turbine blade configured to be incorporated into a rotor of a turbine, the turbine blade comprising a distal end and a proximal end closer to an axis of rotation of the rotor than the distal end when the turbine blade is incorporated into the rotor, wherein at least 60% of the mass and/or volume of the turbine blade is within 50% of a distance from the proximal end to the distal end of the turbine blade.

In some embodiments, a turbine component comprises a rotor comprising a first turbine blade and a second turbine blade, the first turbine blade and the second the turbine blade each comprising: a distal end; a proximal end closer to an axis of rotation of the rotor than the distal end; a longitudinal axis passing through the proximal end and the distal end; and a center of gravity within 45% of a distance along the longitudinal axis from the axis of rotation of the rotor to the distal end of the turbine blade.

In some embodiments, a turbine component comprises a turbine blade configured to be incorporated into a rotor of a turbine, the turbine blade comprising a distal end and a proximal end closer to an axis of rotation of the rotor than the distal end when the turbine blade is incorporated into the rotor, wherein the turbine blade has a longitudinal dimension extending from the proximal end to the distal end, and wherein the turbine blade is configured such that, when incorporated into the rotor, fluid flow along the longitudinal dimension induces rotation of the rotor.

In some embodiments, the turbine component comprises a turbine blade configured to be incorporated into a rotor of a turbine, the turbine blade comprising a distal end and a proximal end closer to an axis of rotation of the rotor than the distal end when the turbine blade is incorporated into the rotor, wherein the turbine blade has a thickness dimension, a longitudinal dimension extending from the proximal end to the distal end, and a lateral dimension perpendicular to the thickness dimension and the longitudinal dimension, wherein the turbine blade has at least one cross-section, taken along a plane parallel to the thickness dimension and the longitudinal dimension, that is in the shape of a first foil, and wherein the turbine blade has at least one cross-section, taken along a plane parallel to the thickness dimension and the lateral dimension, that is in the shape of a second foil.

In some embodiments, a turbine component comprises a turbine blade configured to be incorporated into a rotor of a turbine, the turbine blade comprising a distal end and a proximal end, wherein the turbine blade has a thickness dimension, a longitudinal dimension extending from the proximal end to the distal end, and a lateral dimension perpendicular to the thickness dimension and the longitudinal dimension, wherein the turbine blade has at least one cross-section, taken along a plane parallel to the thickness dimension and the longitudinal dimension, that is in the shape of a first foil, and wherein the turbine blade has at least one cross-section, taken along a plane parallel to the thickness dimension and the lateral dimension, that is in the shape of a second foil.

In some embodiments, a turbine component comprises a turbine blade configured to be incorporated into a rotor of a turbine, the turbine blade comprising (a) a leading edge and a rib along at least a portion of the leading edge; (b) a leading edge, a trailing edge, and a vane extending from the leading edge to the trailing edge; and/or (c) a ratio of the largest chord and the smallest chord on the proximal side of the largest chord in the lateral dimension that is greater than or equal to 1.1.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
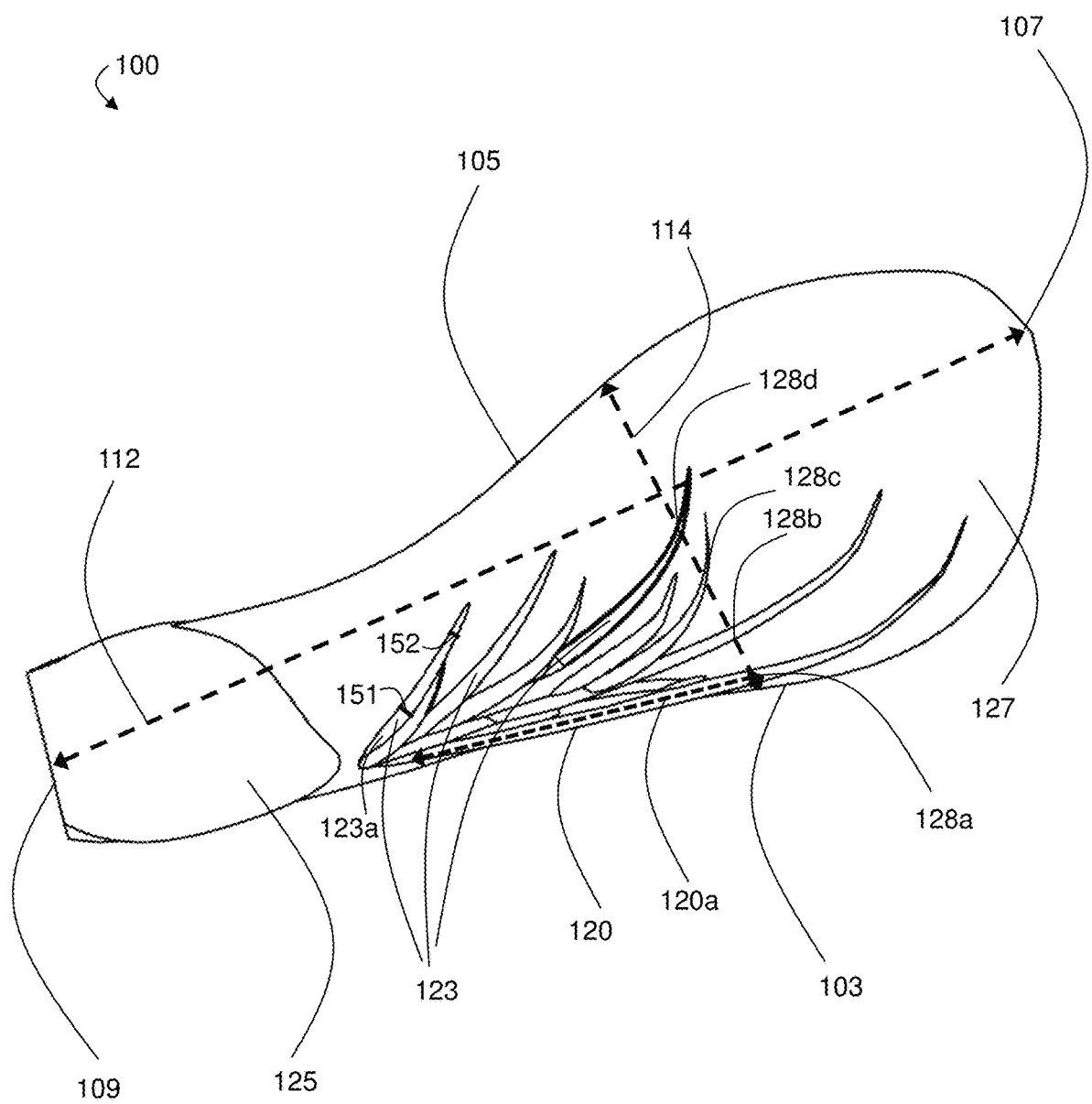
FIGS. 1A-1B show schematic diagrams of an exemplary turbine blade, according to some embodiments.

Turbines and associated components, systems, and methods are described. In some embodiments, the turbine blades and turbines are configured to convert kinetic energy present in fluid (e.g., water) to other forms of energy (e.g., in a hydrokinetic energy system in a river or ocean) relatively efficiently and/or at relatively low cut-in speeds. The turbine blades may have a shape and/or include structural features that contribute at least in part to relatively high efficiency and/or relatively low cut-in speeds. In some embodiments, the turbine blades have a geometry or shape that take advantage of bio-inspired principles. For example, in some instances, the turbine blades have a geometry or shape similar to that of a maple seed (samara).

In nature, when maple seeds are dropped from trees the wing and root portions of the maple seeds align themselves to a steady-state rotational pattern. This rotational pattern, along with the combined effects of aerodynamic coupling of the root and wing, a stable leading edge, and wing tip vortices, generates lift for the maple seed. This lift effect substantially increases the descent time for maple seeds, effectively increasing the distance the maple seed travels from the tree as it falls. This lift-enhanced increase in travel distance ensures a gradual spread of seeds and propagation of the species. Accordingly, maple seeds have evolved through natural selection to exhibit the greatest single blade flying efficiency for both axial and transverse travel.

In certain aspects described herein, turbine blades inspired by the properties and fluid dynamic principles of maple seeds are provided. However, unlike maple seeds, which descend through air, turbines comprising such turbine blades may remain stationary while fluidic motion around the turbine blade induces a rotational effect that, in some cases, is similar to that in nature (e.g., with maple seeds). The rotation may then induce positive torque to generate power. This rotational energy can be converted to other forms of energy, such as electrical energy.

In some cases, the turbine blades have certain mass and/or volume distributions that contribute to relatively improved performance of turbine systems relative to conventional systems. For example, in some instances, a relatively large amount of the mass and/or volume of the turbine blade is located near one end of the turbine blade (e.g., a proximal end close to an axis of rotation of a rotor). In certain cases, the turbine blade is configured such that the center of gravity of the turbine blade is relatively close to an axis of rotation of a rotor. In some embodiments, the turbine blade may be configured to generate lift upon fluid flow along two different axes (e.g., a longitudinal axis and a lateral axis) of the turbine blade. Generation of lift using two different axes can, in some cases, lead to certain advantages compared to conventional turbine blades that generate lift upon fluid flow along only a single axis. For example, the turbine blade may have cross-sections in the shape of a foil in both a longitudinal dimension and a lateral dimension. In some cases, the turbine blades can vary parameters (e.g., chord length, cross-sectional area, camber, pitch angle) along one or more axes to a greater degree than do conventional turbine blades. Varying such parameters to a greater extent can afford beneficial fluid dynamic properties in some cases.

Turbines such as hydroturbines and wind turbines may be useful for generating power from renewable energy resources. One motivation for the use of hydroturbines is that power generation from a fluid is proportional to the density of the fluid. Because water is 822 times more dense than air, the potential for power generation from water is great. Moreover, certain sources of moving water, such as tidal and ocean water currents, are abundant and predictable. However, conventional hydroturbines operate in water speeds ranging from 4-8 m/s. The flow speeds of water in tides, rivers, and ocean currents tend to be in the range of 0.5 to 2.5 m/s. Therefore, conventional hydroturbines can only be operated in very high flow speeds and are restricted in their use to specific geographical locations that are scarce around the globe. Improvements are therefore needed in order to generate power from abundant but lower speed water sources such as tides, rivers, and ocean currents.

Furthermore, conventional hydroturbines typically have prohibitively high cut-in speeds (the fluid speed at which a turbine begins to turn) for marine applications such as tidal currents. Existing conventional hydroturbines have cut-in speeds of about 0.7 to 1.5 m/s (1.4 to 2.9 knots). As a point of comparison, the tidal current speeds at Blynman Canal and Lovel Island, which have the highest tidal flow areas in the Boston Harbor area, are below 1.4 knots a majority of the time (in the case of Blynman Canal) and at all times (in the case of Lovel Island). Therefore, conventional hydroturbines would generate energy only during brief periods of the tidal cycles if located at Blynman Canal, and never if located at Lovel Island.

Most conventional hydroturbines use standard airfoils (e.g., extending from a central hub), with at most minor modification when employed in water as hydrofoils. Efforts in the community to improve the performance of hydroturbines (e.g., in low flow conditions) have focused on drivetrain and generator design. However, the inventors of the present disclosure have instead developed turbine blades themselves that may, in some cases, lead to improved performance (e.g., of hydroturbines, wind turbines). In some embodiments, the turbine blades described herein possess certain mass and/or volume distributions, features, and/or geometries (e.g., having a shape of a maple seed) that can contribute to such improved performances, including in low-flow conditions.

In one aspect, turbine components and turbine systems are described. In some embodiments, the turbine component comprises a turbine blade. FIG. 1A is a schematic diagram of a non-limiting embodiment of turbine blade 100, according to certain embodiments. Generally, when a turbine blade is incorporated into a turbine, the turbine blade is capable of causing torque on a rotor of the turbine (e.g., a hydroturbine or a wind turbine) upon experiencing sufficient force from a fluid (e.g., air or water). Certain aspects of turbine blades described herein can, in some cases, contribute to relatively efficient generation of such torque.

Turbine blades generally have a leading edge and a trailing edge. For example, referring again to FIG. 1A, turbine blade 100 has leading edge 103 and trailing edge 105, according to certain embodiments. In embodiments where during rotation the turbine blade moves through a fluid, the leading edge generally precedes the trailing edge in the direction of motion. In some embodiments, the leading edge is relatively straight. However, in some embodiments, portions of the leading edge may be curved. In some such embodiments, the leading edge may be curved and have an inflection point (e.g., near a maximum chord length) such that a portion of the leading edge is convex with respect to the trailing edge, and a portion of the leading edge is concave with respect to the trailing edge. Such a configuration may, in some cases, contribute to beneficial fluid dynamic properties (e.g., during rotation of the turbine blade).

Figure 2A:
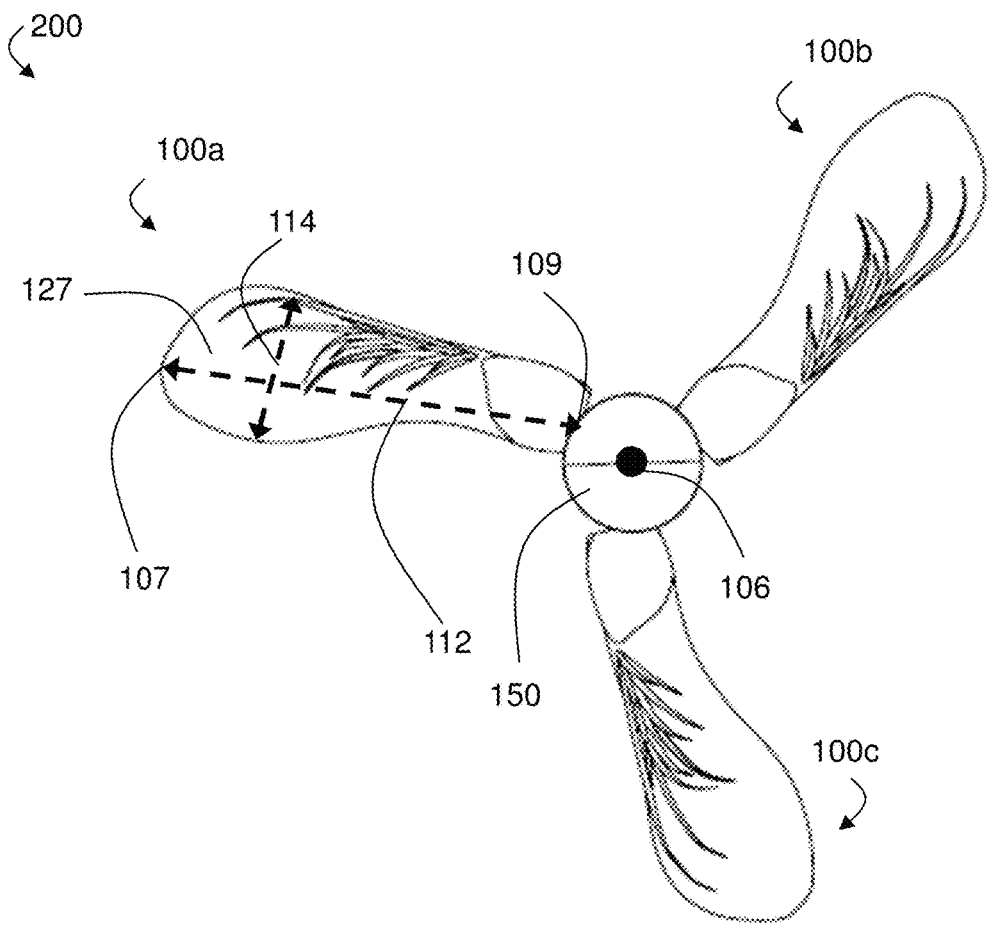
FIG. 2A shows a front view schematic diagram of an exemplary rotor comprising turbine blades, according to some embodiments.

In some embodiments, the turbine blade is configured to be incorporated into a rotor of a turbine. Referring again to FIG. 1A, in some embodiments, exemplary turbine blade 100 is configured to be incorporated into a rotor of a turbine by connecting proximal end 109 or distal end 107 to the rotor. FIG. 2A shows a front view schematic diagram of a non-limiting embodiment in which turbine blade 100a is incorporated into rotor 200. One of ordinary skill, with the benefit of this disclosure, would understand ways in which a turbine blade may be configured to be incorporated into a rotor of a turbine. For example, the turbine blade may be made of materials having adequate properties for use in the rotor of a turbine (e.g., strength, mass density). As another example, the turbine blade may have adequate dimensions or mass for use in the rotor of a turbine. In some cases, the turbine blade may comprise features or components for attachment to components of the rotor (e.g., a hub of a rotor). Further description of rotors of turbines and exemplary configurations are described in more detail below.

Figure 2B:
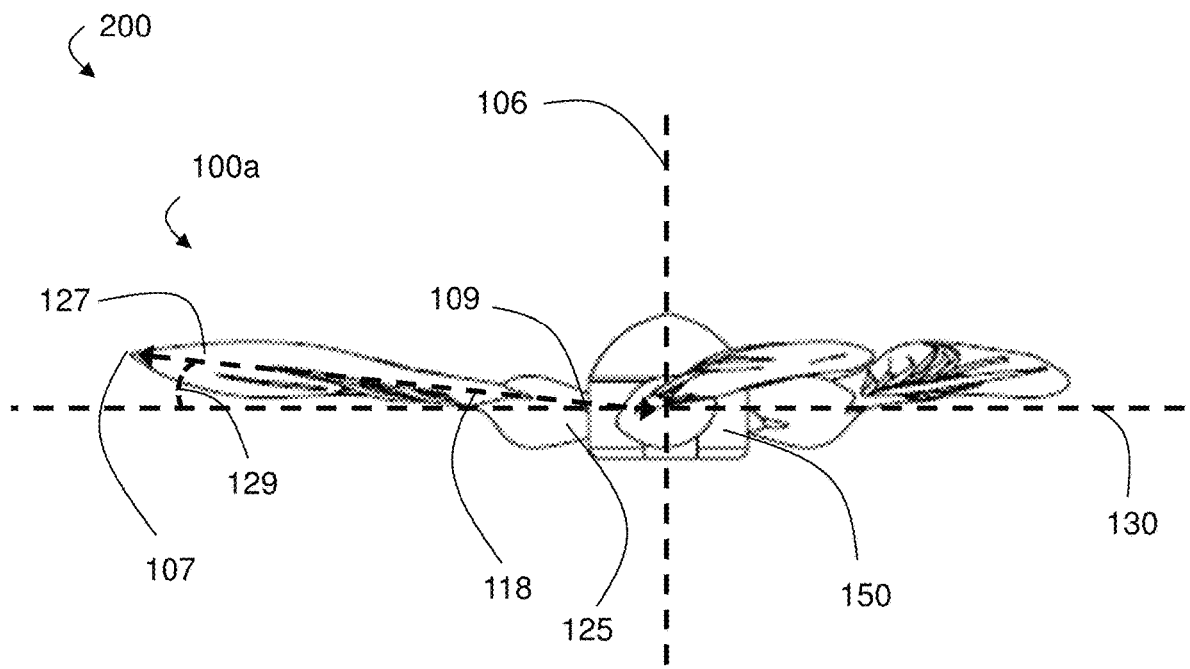
FIG. 2B shows a side view schematic diagram of an exemplary rotor comprising turbine blades, according to some embodiments.

A rotor of a turbine generally has an axis of rotation. For example, when the rotor is part of a hydroturbine or wind turbine, the rotor may have an axis of rotation about which it spins when the turbine encounters moving water or air. Referring again to FIG. 2A, rotor 200 comprising turbine blade 100a has axis of rotation 106 perpendicular to the plane of FIG. 2A, according to certain embodiments. When rotor 200 rotates, turbine blade 100a may rotate about axis of rotation 106 such that turbine blade 100a moves within the plane of FIG. 2A. FIG. 2B shows a side view schematic diagram of rotor 200 having axis of rotation 106, according to certain embodiments.

In some embodiments, the turbine blade comprises a distal end. For example, referring again to FIG. 1A, turbine blade 100 comprises distal end 107. In some embodiments, the turbine blade comprises a proximal end. For example, in FIG. 1A, turbine blade 100 comprises proximal end 109. In some embodiments, the proximal end of the turbine blade is closer to the axis of rotation of a rotor than the distal end when the turbine blade is incorporated into the rotor. FIG. 2A illustrates one such embodiment, where turbine blade 100a comprises distal end 107 and proximal end 109, where proximal end 109 is closer to axis of rotation 106 than is distal end 107.

The turbine blade may have a longitudinal dimension. The longitudinal dimension may extend from the proximal end to the distal end of the turbine blade. Referring again to FIG. 1A, for example, turbine blade 100 has longitudinal dimension 112 (shown as a dotted line) extending from proximal end 109 to distal end 107, according to certain embodiments.

Figure 3A:
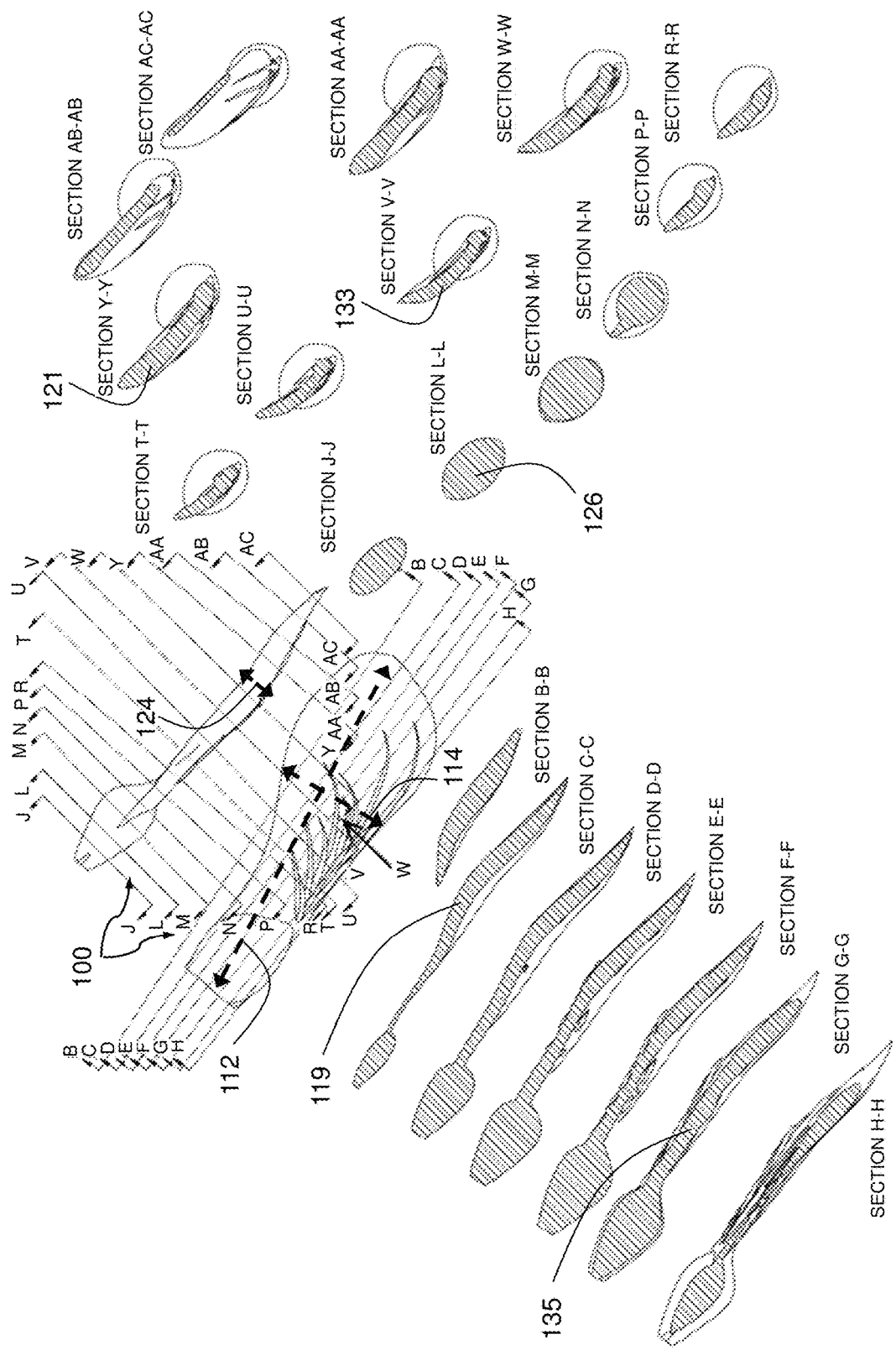
FIG. 3A shows a front view schematic diagram and a side view schematic diagram of an exemplary turbine blade, as well as views of cross-sections of the turbine blade, according to certain embodiments.

The turbine blade may have a thickness dimension. For example, exemplary turbine blade 100 in FIG. 1A has a thickness dimension perpendicular to the plane of FIG. 1A. FIG. 3A includes a side view schematic diagram showing thickness dimension 124 of exemplary turbine blade 100. In some embodiments, the turbine blade has a relatively small maximum thickness in its thickness dimension. For example, in some embodiments, the turbine blade has a maximum thickness of less than or equal to 100 cm, less than or equal to 50 cm, less than or equal to 10 cm, less than or equal to 5 cm, and/or as low as 1 cm, as low as 0.5 cm, as low as 0.1 cm, or less in its thickness dimension. In some embodiments, the turbine blade has a maximum thickness in its thickness dimension that is less than or equal to 0.1, less than or equal to 0.05, less than or equal to 0.01, and/or as low as 0.005, as low as 0.001, or less times the maximum length of the turbine blade in a longitudinal dimension.

The turbine blade may also have a lateral dimension. The lateral dimension is generally perpendicular to the thickness dimension and the longitudinal dimension of the turbine blade. Referring again to FIG. 1A, for example, turbine blade 100 has lateral dimension 114 (shown as a dotted line), according to certain embodiments. In some embodiments, lateral dimension 114 is perpendicular to longitudinal dimension 112 and the thickness dimension (perpendicular to the plane of the FIG. 1A).

It has been observed in the context of the present disclosure that in some instances, the mass distribution of the turbine blade with respect to one or more features of the turbine blade (e.g., proximal end, distal end, longitudinal dimension) can contribute at least in part to any of a variety of advantages. For example, in some embodiments, the mass distribution of the turbine blade is such that a turbine having a rotor in which the turbine blade is incorporated can operate with a relatively low cut-in speed (e.g., upon exposure to fluid). As another example, the mass distribution of the turbine blade is such that a turbine can convert energy from a fluid with a relatively high efficiency.

Figure 1B:
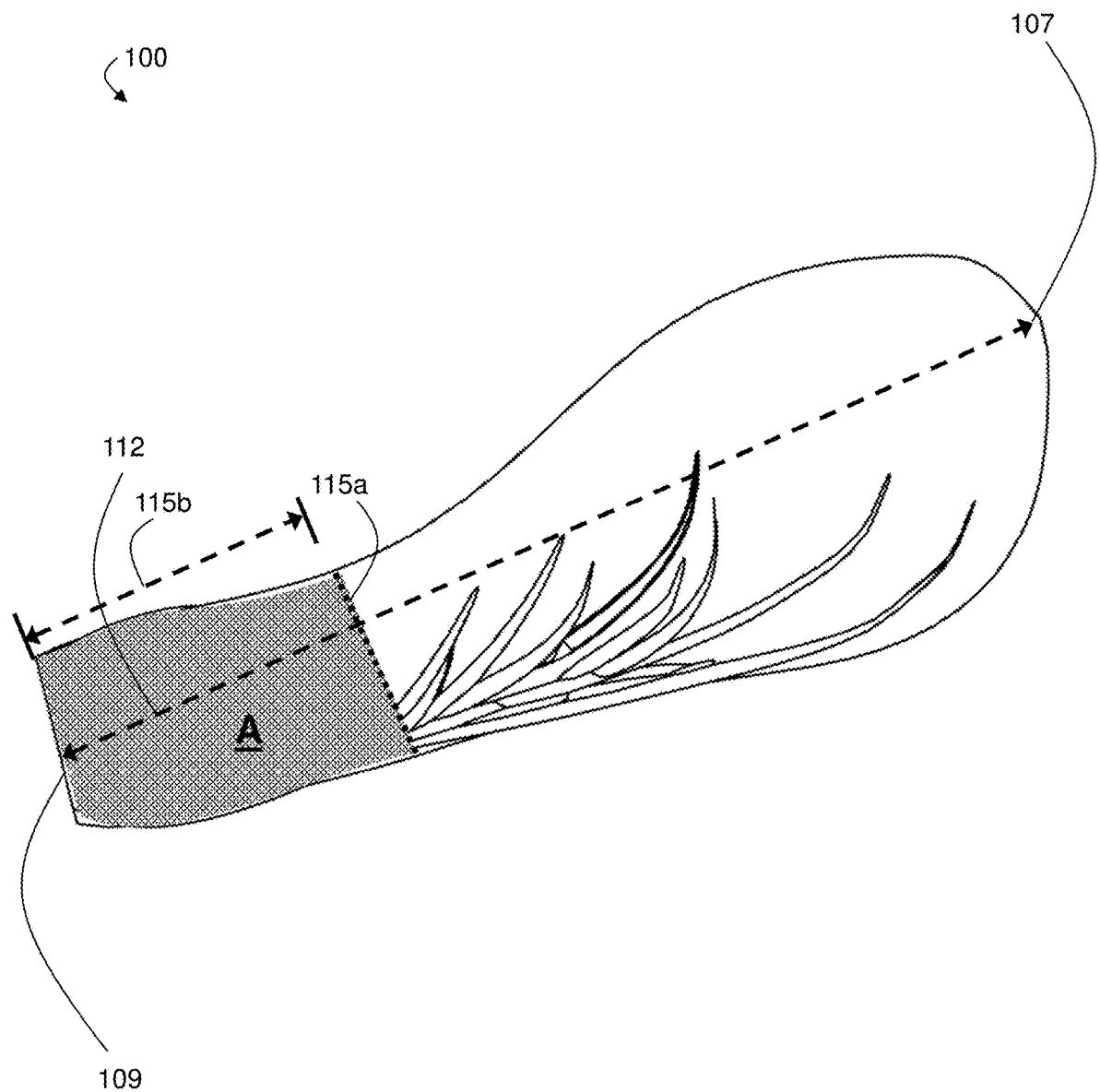

In some embodiments, a relatively high percentage of the mass of the turbine blade is within a relatively small percentage of the distance from the proximal end to the distal end of the turbine blade. In certain cases, concentrating a relatively high amount of the mass of the turbine blade near the proximal end can contribute to any of a variety of advantages. For example, it is been observed in the context of the present disclosure that having a relatively high percentage of the mass of the turbine blade near the proximal end can contribute to a counterbalancing effect. In some cases, a counterbalancing effect can help a turbine comprising such a turbine blade rotate at lower fluid speeds than turbines lacking such an effect. In some embodiments, at least 35%, at least 40%, at least 50%, at least 60%, at least 75%, at least 90%, or more of the mass of the turbine blade is within 50%, within 40%, within 30%, within 25%, or less of a distance from the proximal end to the distal end of the turbine blade. For example, referring to the schematic diagram in FIG. 1B, in some embodiments, at least 35% of the mass of turbine blade 100 is within 25% of the distance from proximal end 109 to distal end 107, according to certain embodiments. In one such exemplary embodiment, 35% of the mass of turbine blade 100 is within 25% of the distance from proximal end 109 to distal end 107, because 35% of the mass of turbine blade 100 is within cross-hatched region A between proximal end 109 and surface 115a at the boundary of region A. In this embodiment, surface 115a is distance 115b from proximal end 109 in the direction of distal end 107, and distance 115b is 25% of the distance 112 from proximal end 109 to distal end 107.

In some embodiments, at least 60%, at least 75%, at least 90%, or more of the mass of the turbine blade is within 50% of a distance from the proximal to the distal end of the turbine blade. In some embodiments, at least 35%, at least 40%, at least 50%, at least 75%, or more of the mass of the turbine blade is within 25% of a distance from the proximal end to the distal end of the turbine blade. In certain cases, at least 60% of the mass of the turbine blade is within 50%, within 40% within 30%, within 25%, or less of a distance from the proximal end to the distal end of the turbine blade. In some cases, at least 35% of the mass of the turbine blade is within 25%, within 15%, within 10%, or less of a distance from the proximal end to the distal end of the turbine blade. In some embodiments, at least 35% of the mass of the turbine blade is within 25% of a distance from the proximal end to the distal end of the turbine blade. In some embodiments, at least 90% of the mass of the turbine blade is within 30% of the distance from the proximal end to the distal end of turbine blade.

In some instances, the center of gravity of the turbine blade can be positioned to achieve one or more operational advantages. For example, in embodiments in which the turbine blade is incorporated into a rotor or configured to be incorporated into a rotor, the center of gravity of the turbine blade may be located relatively close to the axis of rotation of the rotor. It is been observed in the context of the present disclosure that positioning the center gravity of the turbine blade relatively close to the axis of rotation of the rotor can, in some instances, contribute to a greater efficiency of the turbine or an ability for the turbine to rotate with relatively low cut-in speeds (e.g., with a high tip-speed ratio at a low fluid flow rate). In some cases, the shape of the turbine blade is such that that center of gravity is relatively close to the axis of rotation of the rotor when the turbine blade is attached to the rotor. For example, in some embodiments, the turbine blade comprises a relatively massive protruding domain (e.g., a "root", as described below) relatively close to the proximal end such that the center of gravity is closer to the proximal end than the distal end of the turbine blade.

In some embodiments, a turbine component comprises a rotor comprising a turbine blade, and the center of gravity of the turbine blade is within 75%, within 60%, 45%, within 35%, within 20%, within 10%, within 5%, within 1% or less of a distance along a longitudinal axis from the axis of rotation of the rotor to the distal end of the turbine blade. For example, referring again to FIG. 2B, in some embodiments, rotor 200 comprises turbine blade 100a, and the center gravity of turbine blade 100a is within 45% of a distance along longitudinal axis 118 from distal end 107 to axis of rotation 106 of rotor 200. In some cases where the rotor has a single turbine blade, the center of gravity may be located on the axis of rotation of the rotor. In some embodiments (e.g., where the rotor comprises two or more turbine blades), the center of gravity of at least one (or all) of the turbine blades is at a location that is less than or equal to 75%, less than or equal to 60%, less than or equal to 45%, or less, and/or greater than or equal to 20%, greater than or equal to 30%, greater than or equal to 35%, or more of a distance along a longitudinal axis from the axis of rotation of the rotor to the distal end of the turbine blade. Combinations of these ranges are possible (e.g., greater than or equal to 20% and less than or equal to 75%, greater than or equal to 35% and less than or equal to 45%). It should be understood that the longitudinal axis from the axis of rotation of the rotor to the distal end of the turbine blade may not necessarily be perpendicular to the axis of rotation (e.g., in rotors having certain coning angles, as described below).

It has also been observed in the context of the present disclosure that in some instances, the volume distribution of the turbine blade with respect to one or more features of the turbine blade (e.g., proximal end, distal end, longitudinal dimension) can contribute at least in part to any of a variety of advantages. For example, in some embodiments, the volume distribution of the turbine blade is such that a turbine having a rotor in which the turbine blade is incorporated can operate with a relatively low cut-in speed (e.g., upon exposure to fluid). As another example, the volume distribution of the turbine blade is such that a turbine can convert energy from a fluid with a relatively high efficiency.

In some embodiments, a relatively high percentage of the volume of the turbine blade is within a relatively small percentage of the distance from the proximal end to the distal end of the turbine blade. In certain cases, concentrating a relatively high amount of the volume of the turbine blade near the proximal end can contribute to any of a variety of advantages. For example, it is been observed in the context of the present disclosure that having a relatively high percentage of the volume of the turbine blade near the proximal end can contribute to fluid dynamical effects that in some cases can help a turbine comprising such a turbine blade rotate at lower fluid speeds or at higher efficiencies than turbines lacking such an effect. In some embodiments, at least 35%, at least 40%, at least 50%, at least 60%, at least 75%, at least 90%, or more of the volume of the turbine blade is within 50%, within 40%, within 30%, within 25%, or less of a distance from the proximal end to the distal end of the turbine blade. For example, referring to the schematic diagram in FIG. 1B, in some embodiments, at least 35% of the volume of turbine blade 100 is within 25% of the distance from proximal end 109 to distal end 107. In one such exemplary embodiment, 35% of the volume of turbine blade 100 is within 25% of the distance from proximal end 109 to distal end 107, because 35% of the volume of turbine blade 100 is within cross-hatched region A between proximal end 109 and surface 115a at the boundary of region A. In this embodiment, surface 115a is distance 115b from proximal end 109 in the direction of distal end 107, and distance 115b is 25% of the distance 112 from proximal end 109 to distal end 107.

In some embodiments, at least 60%, at least 75%, at least 90%, or more of the volume of the turbine blade is within 50% of a distance from the proximal to the distal end of the turbine blade. In some embodiments, at least 35%, at least 40%, at least 50%, at least 75%, or more of the volume of the turbine blade is within 25% of a distance from the proximal end to the distal end of the turbine blade. In certain cases, at least 60% of the volume of the turbine blade is within 50%, within 40% within 30%, within 25%, or less of a distance from the proximal end to the distal end of the turbine blade. In some cases, at least 35% of the volume of the turbine blade is within 25%, within 15%, within 10%, or less of a distance from the proximal end to the distal end of the turbine blade. In some embodiments, at least 35% of the volume of the turbine blade is within 25% of a distance from the proximal end to the distal end of the turbine blade. In some embodiments, at least 90% of the volume of the turbine blade is within 30% of the distance from the proximal end to the distal end of turbine blade.

In some embodiments, one or more cross-sections of the turbine blade is in the shape of a foil. Generally, a cross-section of an object is in the shape of a foil if, for at least one angle of attack, relative motion between that object and a fluid in a direction parallel to the cross-section generates more lift than drag. Examples of foils include hydrofoils (which can generate lift in liquids such as water and might be used, for example, in hydroturbines) and airfoils (which can generate lift in gases such as air and might be used, for example, in wind turbines). Exemplary objects having a cross-section in the shape of a foil are airplane wings and propeller blades. The foil shapes used in certain turbine blades described herein may be used as airfoils and hydrofoils, and their use as hydrofoils can be particularly advantageous in certain cases. In some cases, a foil is shaped such that relative motion between the fluid and the object with a zero angle of attack generates more lift than drag. A foil may have a rounded leading edge and a sharper trailing edge. In some cases, the foil shape has a symmetric upper and lower section (relative to the leading edge and trailing edge), while in other cases there is an asymmetry (camber) between the upper and lower sections, as described in more detail below. In some embodiments in which the turbine blade is incorporated into a hydroturbine, one or more cross-sections of the turbine blade may be in the shape of a hydrofoil. In some embodiments in which the turbine blade is incorporated into a wind turbine, one or more cross-sections of the turbine blade may be in the shape of an airfoil.

In some embodiments, the turbine blade is configured such that, when incorporated into a rotor, fluid flow (e.g., water flow, air flow) along a longitudinal dimension of the turbine blade induces rotation of the rotor. As an example, referring again to FIG. 2A, in some embodiments, turbine blade 100a is incorporated into rotor 200, which can be part of a turbine exposed to a fluid, according to some embodiments. In some embodiments, the flow of the fluid (e.g., water) along longitudinal dimension 112 of turbine blade 100a induces rotation of rotor 200 by generating lift. Having a turbine blade be configured such that fluid flow along the longitudinal dimension of the turbine blade induces rotation stands in contrast to certain conventional turbine configurations. For example, in conventional turbine configurations, fluid flow across the lateral dimension, not the longitudinal dimension, is responsible for the generation of lift and therefore rotation. An ability for a turbine blade to induce rotation via fluid flow along a longitudinal dimension can, in some cases, contribute to increased efficiencies for energy conversion (e.g., in hydroturbines) relative to turbines with conventional blades.

In some embodiments, the turbine blade has at least one cross-section, taken along a plane parallel to the thickness dimension and the longitudinal dimension, that is in the shape of a foil. For example, referring to FIG. 1A, in some embodiments, turbine blade 100 has at least one cross-section, taken along a plane parallel to longitudinal dimension 112 and a thickness dimension perpendicular to the plane of FIG. 1A, that is in the shape of a foil (e.g., a hydrofoil and/or an airfoil). In certain cases, having at least one cross-section parallel to the thickness dimension and the longitudinal dimension contributes to an ability for the turbine blade to induce rotation of the rotor upon flow of fluid along the longitudinal dimension of the turbine blade.

FIG. 3A shows illustrations of sections of exemplary turbine blade 100, according to certain embodiments. Sections B-B, C-C, D-D, E-E, F-F, G-G, and H-H show exemplary cross-sections taken along a plane parallel to the thickness dimension and the longitudinal dimension of turbine blade 100, according to certain embodiments. All such sections in FIG. 3A include cross-sections that are in the shape of a foil, in accordance with some embodiments.

In certain instances, the turbine blade is configured such that, when incorporated into a rotor, fluid flow (e.g., water flow, air flow) along a lateral dimension of the turbine induces rotation of the rotor. As an example, in FIG. 2A, turbine blade 100a is incorporated into rotor 200, which can be part of a turbine exposed to fluid, according to some embodiments. In some embodiments, the flow of fluid (e.g., water) across lateral dimension 114 of turbine blade 100a induces rotation of rotor 200.

In some embodiments, the turbine blade has at least one cross-section, taken along a plane parallel to the thickness dimension and the lateral dimension, that is in the shape of a foil (e.g., a hydrofoil and/or an airfoil). For example, referring again to FIG. 1A, turbine blade 100 has at least one cross-section, taken along a plane parallel to lateral dimension 114 and a thickness dimension perpendicular to the plane of FIG. 1A, that is in the shape of a foil. In certain cases, having at least one cross-section parallel to the thickness dimension and the longitudinal dimension that is in the shape of a foil contributes to an ability for the turbine blade to induce rotation of the rotor upon flow of fluid along the lateral dimension of the turbine blade.

Figure 3B:
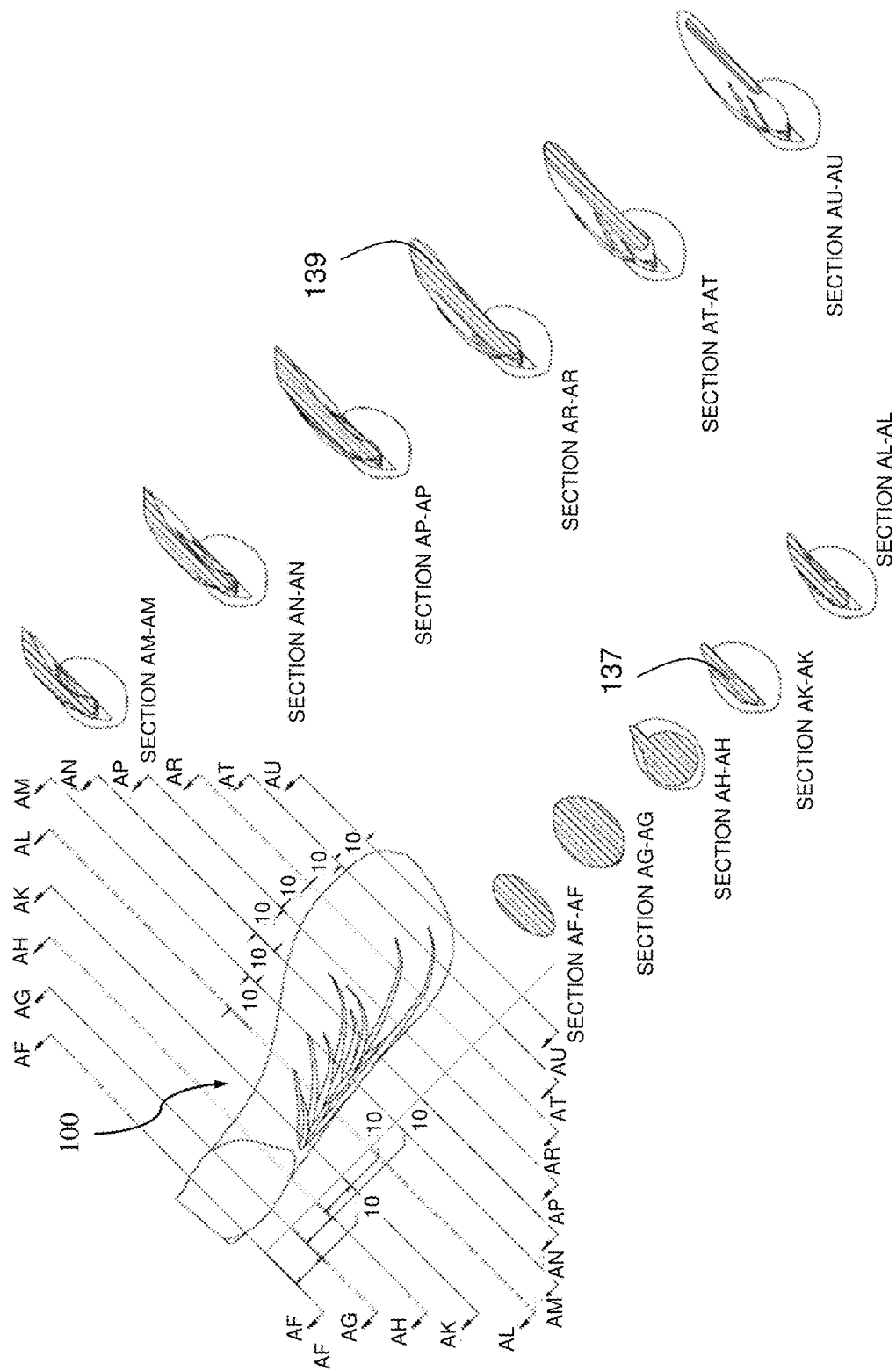
FIG. 3B shows a front view schematic diagram of an exemplary turbine blade, as well as schematic diagrams of cross-sections of the turbine blade, according to certain embodiments.

FIGS. 3A-3B show illustrations of sections of exemplary turbine blade 100, according to certain embodiments. Sections J-J, L-L, M-M, N-N, P-P, R-R, T-T, U-U, V-V, W-W, Y-Y, AA-AA, AB-AB, AC-AC, AF-AF, AG-AG, AH-AH, AK-AK, AL-AL, AM-AM, AN-AN, AP-AP, AR-AR, AT-AT, and AU-AU show exemplary cross-sections that are taken along a plane parallel to the thickness dimension and the lateral dimension of turbine blade 100, according to certain embodiments. All such sections in FIGS. 3A-3B include cross-sections that are in the shape of a foil, according to some embodiments.

In some embodiments, the turbine blade is configured such that, when incorporated into a rotor, fluid flow (e.g., water flow, air flow) along both the lateral dimension and a longitudinal dimension of the turbine blade induces rotation of the rotor. The ability to induce rotation of a rotor upon fluid flow in both lateral and longitudinal directions across the turbine blade can, in some cases, contribute to increased efficiencies and/or lower cut in-speeds for turbines.

In some embodiments, the turbine blade has cross-sections in two or more non-parallel planes, both of which are in the shape of the foil. As one example, in some embodiments, the turbine blade has at least one cross-section, taken along a plane parallel to the thickness dimension and the longitudinal dimension, that is in the shape of a first foil, and the turbine blade also has at least one cross-section, taken along a plane parallel to the thickness dimension and the lateral dimension, that is in the shape of a second foil. FIG. 3A shows one exemplary such embodiment, where turbine blade 100 has cross-section 119 (hatched portion of section C-C), taken along a plane parallel to longitudinal dimension 112 and thickness dimension 124, that is in the shape of a first foil, and turbine blade 100 also has cross-section 121 (hatched portion of section Y-Y), taken along a plane parallel to lateral dimension 114 thickness dimension 124, that is in the shape of a second foil. In some embodiments, the first foil and the second foil have the same or similar shapes (e.g., by having the same or similar chord lengths, cambers, cross-sectional areas, etc.). However, in some embodiments, the first foil and the second foil have different shapes (e.g., by having different chord lengths, cambers, cross-sectional areas, etc.).

In certain cases, a relatively high percentage of cross-sections, taken along a plane parallel to the thickness dimension and the longitudinal dimension, are in the shape of a foil. For example, referring to FIG. 1A, a relatively high percentage of cross-sections, each of which are parallel to longitudinal dimension 112 and the thickness of turbine blade 100 perpendicular to the plane of FIG. 1A, are in the shape of a foil, in accordance with certain embodiments. It should be understood that while a relatively high percentage of cross-sections, taken along a plane parallel to the thickness dimension and the longitudinal dimension, may be in the shape of the foil, those cross-sections need not each have the same shape or dimensions. For example, the foil shape may vary among those cross-sections, as described in more detail below. Having a relatively high percentage of cross-sections in a particular dimension (such as parallel to a longitudinal or lateral dimension of a turbine blade) in the shape of a foil may contribute to an ability for the turbine blade to generate lift upon fluid flow across that particular dimension. In some cases, a greater ability to generate lift a particular dimension may increase efficiency or decrease the cut-in speed of a turbine comprising such a turbine blade.

In some embodiments, at least 90%, at least 95%, at least 99%, or 100% of cross-sections, taken along a plane parallel to the thickness dimension and the longitudinal dimension at 1% increments across the lateral dimension, are in the shape of a foil. The percentage of cross-sections taken along a plane parallel to the thickness dimension and the longitudinal dimension that are in the shape of a foil can be determined, for example, by taking a three-dimensional scan of the turbine blade and using a three-dimensional computer modeling program.

In certain cases, a relatively high percentage of cross-sections, taken along a plane parallel to the thickness dimension and the lateral dimension, are in the shape of a foil. For example, referring to FIG. 1A, a relatively high percentage of cross-sections, each of which are parallel to lateral dimension 114 and the thickness of turbine blade 100 perpendicular to the plane of FIG. 1A, are in the shape of a foil, according to some embodiments. It should be understood that while a relatively high percentage of cross-sections, taken along a plane parallel to the thickness dimension and the lateral dimension, may be in the shape of the foil, those cross-sections need not each have the same shape or dimensions.

In some embodiments, at least 90%, at least 95%, at least 99%, or 100% of cross-sections, taken along a plane parallel to the thickness dimension and the lateral dimension at 1% increments across the longitudinal dimension, are in the shape of a foil. Determining the percentage of cross-sections, taken along a plane parallel to the thickness dimension and the lateral dimension, that are in the shape of a foil can be done analogously to as described above for cross-sections taken along planes parallel to the thickness dimension and the longitudinal dimension. In some embodiments, at least 90%, at least 95%, at least 99%, or 100% of cross-sections taken along a plane parallel to the thickness dimension and the longitudinal dimension at 1% increments across the lateral dimension, are in the shape of a foil, and at least 90%, at least 95%, at least 99%, or 100% of cross-sections, taken along a plane parallel to the thickness dimension in the lateral dimension at 1% increments across the longitudinal dimension, are in the shape of a foil.

Figure 4A:
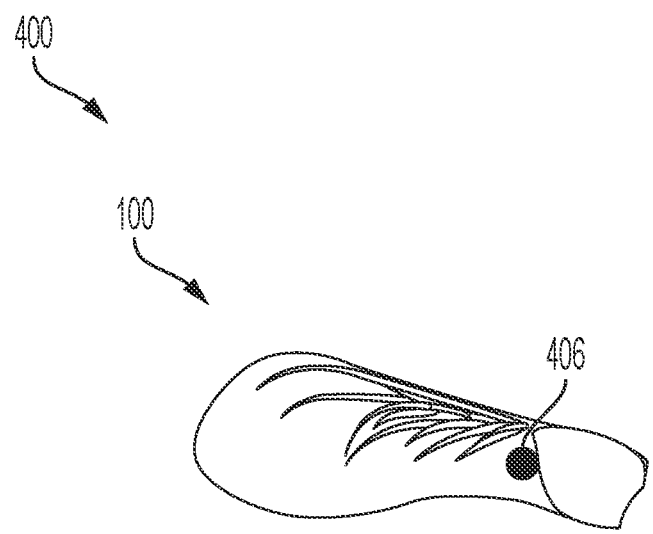
FIG. 4A shows a front view schematic diagram of an exemplary rotor having a single turbine blade, according to some embodiments.
Figure 4B:
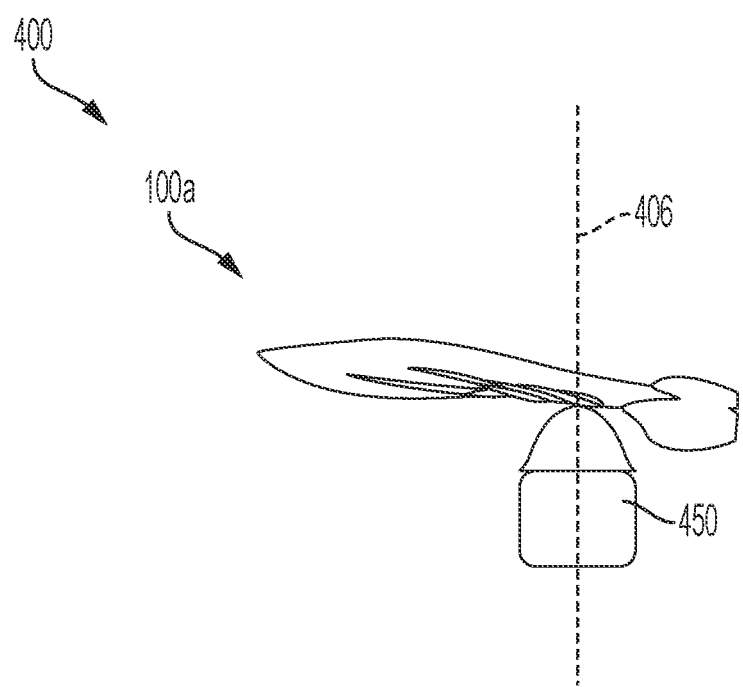
FIG. 4B shows a side view schematic diagram of an exemplary rotor having a single turbine blade, according to some embodiments.

As mentioned above, the turbine blades may be configured to be incorporated into a rotor of a turbine (e.g., a hydroturbine). FIGS. 2A-2B illustrate exemplary rotor 200, according to certain embodiments. Rotor 200 comprises turbine blade 100a, turbine blade 100b, and turbine blade 100c. It should be understood that while exemplary rotor 200 comprises three turbine blades, any suitable number of turbine blades may be incorporated into a rotor. In some embodiments, a rotor has a single turbine blade. FIGS. 4A-4B show front and side view schematic diagrams, respectively, of one such embodiment, where exemplary rotor 400 has single turbine blade 100, which can rotate about axis of rotation 406 passing through hub 450 attached to turbine blade 100 (hub 450 is hidden behind turbine blade 100 in FIG. 4A). In some embodiments, when a rotor has a single turbine blade, the rotor may be configured such that the axis of rotation of the rotor passes through the inertial center of the turbine blade. For example, in some cases, axis of rotation 406 passes through the inertial center of turbine blade 100. In some such cases, such a configuration contributes to a counterbalancing effect that may reduce bending moments on, for example, a shaft of a turbine (e.g., a shaft connected to hub 450), and/or reduce any resulting vibration while making a constant torque across each rotation.

In certain embodiments, a rotor comprises multiple turbine blades. For example, in some embodiments, a turbine component comprises a first turbine blade and a second turbine blade (e.g., incorporated into a rotor). In some embodiments, a rotor comprises at least 1 turbine blade, at least 2 turbine blades, at least 3 turbine blades, at least 4 turbine blades, and/or up to 5 turbine blades, up to 10 turbine blades, up to 20 turbine blades, or more. Combinations of these ranges are possible. For example, in some embodiments, a rotor comprises at least one turbine blade and up to 20 turbine blades.

The rotors described in this disclosure can have any of a variety of configurations. The configuration of the rotor may depend, for example, on the desired alignment of the rotor with respect to fluid flow (e.g., axial alignment vs. cross-flow alignment).

In some embodiments, the rotor comprises a hub. For example, referring again to FIGS. 2A-2B, rotor 200 comprises hub 150. As such, in some embodiments, the turbine blade (e.g., turbine blade 100) is configured to be incorporated into a rotor by being attached to a hub of the rotor. In some embodiments, a turbine blade is attached to and extends from the hub. In some such cases, the turbine blade is attached to the hub via its proximal end. As one example, in FIG. 2A, turbine blade 100a is attached to hub 150 via proximal end 109 and extends from hub 150. It should be understood that when a turbine blade is attached to a hub of a rotor, the turbine blade may be attached directly to the hub or the turbine blade may be attached indirectly to the hub. When a turbine blade is attached directly to a hub, the turbine blade interfaces with the hub such that no intervening layers or components are between the turbine blade and the hub. In contrast, when a turbine blade is attached indirectly to a hub, one or more intervening layers or components are between the turbine blade and the hub. While FIGS. 2A and 2B show a direct attachment between turbine blade 100a and hub 150, such illustration are exemplary, and one or more intervening layers or components may be present. In some embodiments, the axis of rotation of the rotor passes through the hub. For example, referring again to FIGS. 2A-2B, axis of rotation 106 passes through hub 150, such that rotation of rotor 200 involves rotation of hub 150.

In some embodiments, the hub is hollow. As would be generally understood, a hollow solid object has one or more interior regions completely bound by the object that is unoccupied by solid material. In some instances, some (e.g., at least 10%, at least 25%, at least 50%, at least 75%, at least 90%, at least 95%, at least 99%) or all of the one or more interior regions unoccupied by solid material is occupied by gas (e.g., air) or empty space (e.g., vacuum). In some embodiments, a ratio of a largest cross-sectional dimension of at least one such interior region unoccupied by solid material to a largest cross-sectional dimension of the hub is at least 0.01, at least 0.1, at least 0.2, at least 0.5, at least 0.75, at least 0.9, or greater. For example, referring back to FIG. 7C, hub 150 may have largest cross-sectional dimension 154, and hub 150 may comprise an interior region 155 unoccupied by solid material. Interior region 155 may have largest cross-sectional dimension 156, and in some embodiments a ratio of largest cross-sectional dimension 156 to dimension 154 is within one of the above ranges. It has been realized in the context of this disclosure that configuring a hub to be hollow can reduce the mass of the turbine component and thereby reduce potential inertial inefficiencies. Such an effect can, in some instances, result in turbines employing such hubs operating at relatively low cut-in speeds and/or at relatively high energy conversion efficiencies compared to those employing non-hollow hubs having a same external shape. In some embodiments, less than or equal to 90%, less than or equal to 75%, less than or equal to 50%, less than or equal to 25%, less than or equal to 10%, or less of the volume bound by the exterior surface of the hub is occupied by solid material. In some embodiments, at least 10%, at least 25%, at least 50%, at least 75%, at least 90%, or more of the volume bound by the exterior surface of the hub is occupied by gas or empty space.

Figure 5A:
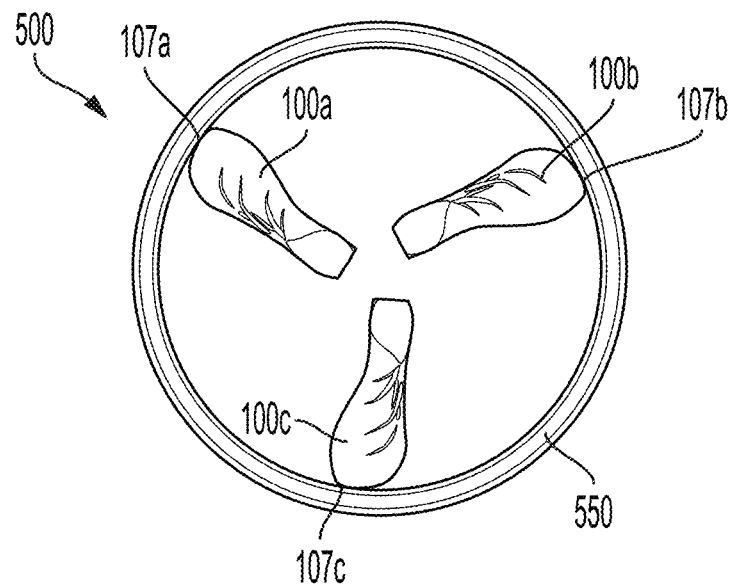
FIG. 5A shows a front view schematic illustration of an exemplary rotor comprising turbine blades and an exterior structure, according to some embodiments.
Figure 5B:
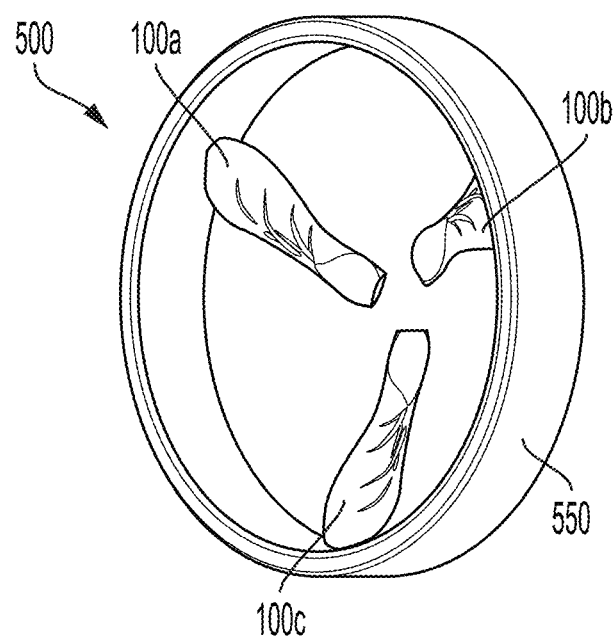
FIG. 5B shows a perspective view schematic illustration of an exemplary rotor comprising turbine blades and an exterior structure, according to some embodiments.

In some embodiments, the rotor does not comprise a hub. A rotor lacking a hub may be useful under some conditions or applications where a high amount of fouling is expected to occur. Such a rotor may also be expected to have higher efficiencies in some cases because the fluid can flow naturally over proximal portions of the turbine blade (e.g., the root when present), inducing a rotational effect like that in nature (e.g., with maple seeds). Additionally, a rotor lacking a hub may cause a relatively low impingement on sea life relative to a rotor comprising a hub. In some embodiments, the rotor comprises an exterior structure, and the turbine blade is attached to the exterior structure. The exterior structure may comprise or be a solid support. In some cases, the exterior structure comprises or is a solid scaffold. The exterior structure may comprise or be a solid support or scaffold at least partially enclosing a turbine blade attached to the exterior structure. In some embodiments, the rotor comprises an exterior structure, and the turbine blade is attached to the exterior structure via the distal end of the turbine blade. The exterior structure may have any suitable form, provided that fluid can flow through the structure to induce rotation of the rotor. In some embodiments, the exterior structure comprises a cylinder (e.g., the exterior structure is a cylinder). For example, FIGS. 5A-5B show a front view schematic illustration and a perspective view schematic illustration, respectively, of exemplary rotor 500 comprising exterior structure 550, which is illustrated as being cylindrical. In FIGS. 5A-5B, turbine blades 100a, 100b, and 100c are attached to exterior structure 550 via distal end 107a, distal end 107b, and distal end 107c, respectively, according to certain embodiments. As above, it should be understood that when a turbine blade is attached to an exterior structure (e.g., cylinder) of a rotor, the turbine blade may be attached directly to the exterior structure or the turbine blade may be attached indirectly to the exterior structure. When a turbine blade is attached directly to a structure, the turbine blade interfaces with the exterior structure such that no intervening layers or components are between the turbine blade and the exterior structure. In contrast, when a turbine blade is attached indirectly to an exterior structure, one or more intervening layers or components are between the turbine blade and the exterior structure.

In some embodiments, the rotor is configured to be used in an axial turbine. Axial turbines are generally configured such that rotation is caused by the flow of fluid in a direction parallel to the axis of rotation of the rotor. Generally, the primary drive direction of an axial turbine is parallel to the axis of rotation of the rotor (see below for more detail). For example, rotor 200 in FIGS. 2A-2B, rotor 300 in FIGS. 3A-3B, and rotor 400 in FIGS. 4A-4B can be configured to be used in axial turbines, according to certain embodiments. In axial turbines, as fluid flows past the turbine blades, lift is generated that causes force that is transferred as torque to the rotor.

Figure 6A:
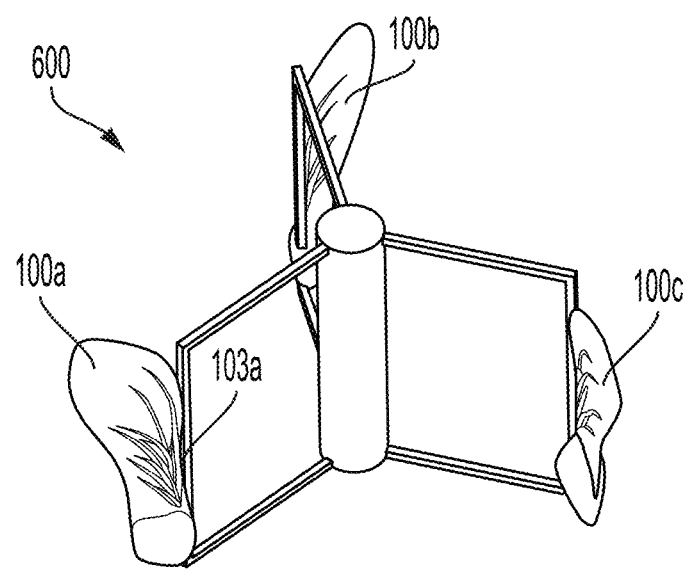
FIG. 6A shows a perspective view schematic illustration of an exemplary rotor comprising turbine blades in a cross-flow configuration, according to some embodiments.
Figure 6B:
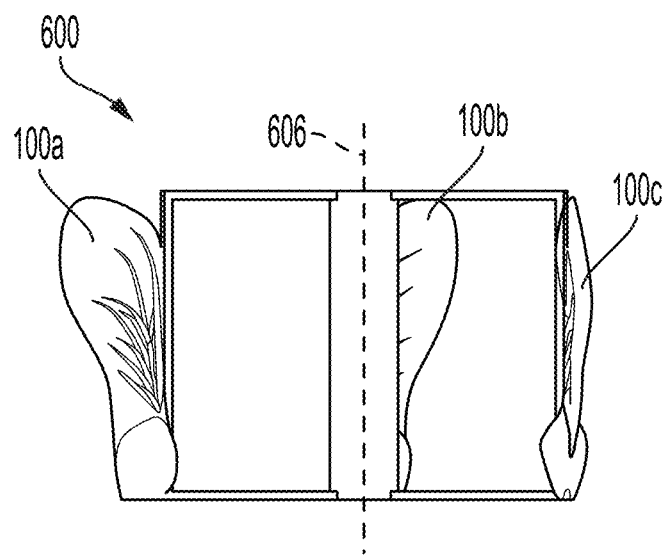
FIG. 6B shows a side view schematic illustration of an exemplary rotor comprising turbine blades in a cross-flow configuration, according to some embodiments.

However, the present disclosure is not limited to axial turbine applications, and in some embodiments, the rotor has an alternative configuration. For example, in some embodiments, the rotor is configured to be used in a cross-flow turbine. Cross-flow turbines are generally configured such that rotation is caused by the flow of fluid in a direction perpendicular to the axis of rotation of the rotor. Generally, the primary drive direction of a cross-flow turbine is perpendicular to the axis of rotation of the rotor (see below for more detail). As the rotor spins, the turbine blades are brought successively in and out of alignment with the fluid flow. In alignment, the turbine blades generate lift, transferring torque to the rotor. Out of alignment, the turbine blades generate drag, either opposing or promoting rotation depending on the angular position with respect to the flow. At fluid speeds above a cut-in speed, the lift generated by the transiently aligned foils generates a sufficient torque for rotation to occur. FIGS. 6A-6B show a perspective view schematic illustration and a side view schematic illustration, respectively, of exemplary rotor 600 comprising turbine blades 100a, 100b, and 100c, and axis of rotation 606, according to certain embodiments. Rotor 600 is configured, in some embodiments, to be used in a cross-flow turbine. It should also be understood that exemplary rotor 200 in FIGS. 2A-2B can also be used in cross-flow embodiments. In some embodiments in which a turbine component comprises a rotor configured to be used in a cross-section flow configuration, the turbine blade is arranged such that a longitudinal dimension extending from the proximal end to the distal end of the turbine blade is substantially parallel with the axis of rotation of the rotor. For example, an angle between the longitudinal dimension of the turbine blade and the axis of rotation of the rotor may be less than or equal to 30°, less than or equal to 20°, less than or equal to 10°, less than or equal to 5°, and/or as low as 2°, as low as 10, or less. In some embodiments in which a turbine component comprises a rotor configured to be used in a cross-section flow configuration, the turbine blade is attached to the rotor via at least a portion of its leading edge. For example, in FIG. 6A, turbine blade 100a is attached to rotor 600 via leading edge 103a. However, in some embodiments a turbine component comprising a rotor having turbine blades extending from a hub (e.g., by being attached to the rotor via a proximal end such as in FIGS. 2A-2B) can be used in cross-flow embodiments.

In some embodiments, turbine components described herein are capable of rotating with relatively high tip-speed ratios. Tip-speed ratio generally refers to the ratio between the tangential speed of the outermost point of the rotor and the speed of the fluid incident upon the turbine component. For example, in embodiments in which a turbine component comprises a rotor comprising a turbine blade extending from a hub, the tip speed ratio refers to the ratio between the tangential speed at the distal end of the turbine blade the speed of the incident fluid upon the rotor. Having a relatively high tip-speed ratio at relatively low fluid speeds can, in some cases, allow a turbine to operate with a relatively high efficiency and/or relatively low cut-in speed.

The primary drive direction of a given rotor is generally the direction of fluid flow with respect to the rotor that causes the rotor to rotate at the greatest speed. For example, the primary drive direction is generally parallel to the axis of rotation of the rotor for axial rotors and perpendicular to the axis of rotation for cross-flow rotors. In general, axial rotors (and axial turbines) have a higher tip-speed ratio when water is flowed in a direction parallel to the axis of rotation than when water is flowed in a direction perpendicular to the axis of rotation. On the other hand, cross-flow rotors (and cross-flow turbines) generally have a higher tip-speed ratio when water is flowed in a direction perpendicular to the axis of rotation than when water is flowed in a direction parallel to the axis of rotation In some embodiments, a turbine system described in this disclosure (e.g., comprising a turbine component) is able to convert energy (e.g., mechanical energy) with relatively high efficiency. Any of the features of the turbine blade described herein (e.g., shape, dimensions, components, mass distribution) may, alone or in combination, contribute to a turbine system comprising the turbine blade converting energy at a relatively high efficiency.

In some embodiments, the turbine component or system comprises a rotor having relatively large diameter. Having relatively large diameter may allow the turbine comprising the turbine component to convert a relatively high amount of energy from a fluid to a different form of energy, such as electrical energy. One of ordinary skill, with the benefit of this disclosure, would be able to determine the diameter of the rotor of a turbine. In some embodiments, the rotor has a diameter of at least 10 mm, at least 50 mm, at least 100 mm, at least 0.5 m, at least 1 m, at least 2 m, at least 5 m, at least 10 m, and/or up to 20 m, up to 25 m, up 30 m, or more.

In some embodiments, the turbine blade comprises a rib along at least a portion of the leading edge of the turbine blade. For example, referring again to FIG. 1A, in some embodiments, the turbine blade 100 comprises optional rib 120 along at least a portion of leading edge 103. In some embodiments, the thickness of the turbine blade is greatest at the rib. In certain cases in which the turbine blade comprises a root portion, the thickness of the turbine blade is greatest at the rib with the exception of the root portion, which may protrude from the turbine blade and have a greater thickness than the rib. In some cases, the thickness of a distal portion of the turbine blade (closer to the distal end than the proximal end) is greatest at the rib. In some cases, the longitudinal axis of the rib runs along the leading edge of the turbine blade. For example, in FIG. 1A, longitudinal axis 120a of optional rib runs along leading edge 103.

In some embodiments, the rib of the turbine blade is relatively thick. A relatively thick rib may afford any of a variety of possible advantages, including increasing the strength and/or stiffness of the turbine blade as well as beneficially affecting certain fluid dynamical phenomena such as boundary layer formation, as described in more detail below. In some embodiments, the rib has a maximum thickness of greater than or equal to 0.1 cm, greater than or equal to 0.5 cm, greater than or equal to 1 cm, greater than or equal to 5 cm, and/or less than or equal to 10 cm, less than or equal to 50 cm, less than or equal to 100 cm, or more. Combinations of these ranges are possible. For example, in some embodiments, the rib has a maximum thickness of greater than or equal to 0.5 cm and less than or equal to 100 cm. In some embodiments, the rib has a maximum thickness of greater than or equal to 0.1 cm and less than or equal to 100 cm.

It has been observed that in certain cases, the rib lends structural resistance against bending moments about the lateral dimension of the turbine blade. For example, in some cases, the rib increases the stiffness of the blade. It has also been observed that in certain cases the rib has a lift-generating effect when fluid flows across the lateral dimension of turbine blade. Such a lift-generating effect may induce rotation of a rotor in which the turbine blade is incorporated. It has been observed in certain cases that in rotation, a low-pressure boundary layer forms behind the rib that helps to increase lift relative to cases in which the turbine blade lacks such a rib. The boundary may result from fluid flowing along a longitudinal dimension of the turbine blade as it rotates. Without wishing to be bound by any particular theory, the association of the boundary layer with the longitudinal flow may contribute to a relatively high stability of the rotation, which may result in less turbulence and drag than in configurations in which the rib is absent.

In some embodiments, the turbine blade comprises vanes. In some such cases, the vanes extend from the leading edge toward the trailing edge of the turbine blade. For example, referring again to FIG. 1A, turbine blade 100 comprises vanes 123 extending from leading edge 103 toward trailing edge 105, according to some embodiments. In some embodiments, the vanes are curved, such that they begin approximately parallel to the rib (e.g., rib 120), then curve backward toward the proximal end, until the imaginary curved lines defined by the axes of the vanes reach the trailing edge at an angle approximately perpendicular (e.g., within 10°, within 5°, within 1°, or less of perpendicular) to the trailing edge. In some cases, the spacing between the vanes (and the imaginary curved lines defined by the axes of the vanes and extending from the end of the vanes to the trailing edge) varies with position along the lateral dimension of the turbine blade. Considering a lateral line drawn perpendicularly from the leading edge to the trailing edge, the distance between each intersection of the lateral line with each of the vanes may be greater than the previous distance in the trailing edge direction by a spacing factor. In some embodiments, that spacing factor is greater than or equal to 1.3, greater than or equal to 1.4, greater than or equal to 1.5, greater than or equal to 1.6, and/or up to 1.7, up to 1.8, up to 1.9, or more. In some embodiments, the spacing factor is 1.6. As an illustrative example, FIG. 1A shows an embodiment in which a line representing lateral dimension 114 intersects vanes 123 at intersections 128a, 128b, 128c, and 128d. Intersections 128a, 128b, 128c, and 128d have a spacing factor of 1.6, for example, because the spacing between intersection 128b and intersection 128c is 1.6 times greater than the spacing between intersection 128a and intersection 128b, and so forth. In some embodiments, the vanes of the turbine blade satisfy the ranges for the spacing factor above along at least 50%, at least 75%, at least 90%, at least 95%, or more of the distance along the longitudinal dimension of the turbine blade. In some embodiments, at least 50%, at least 75%, at least 90%, at least 95%, or more of the vanes of the turbine blade satisfy the ranges for the spacing factor above (e.g., if the turbine blade has 10 vanes, and at least 5 of the vanes satisfy one of the ranges for spacing factor above, then at least 50% of the vanes satisfy the spacing factor range). It has been observed in certain cases that the vanes increase structural rigidity against bending moments about the longitudinal dimension of the turbine blade. In some embodiments in which the vanes are curved in the manner described above, the vanes may further increase structural rigidity against twisting moments about the longitudinal dimension and, to a lesser extent, against bending moments about the lateral dimension as well. In some embodiments, during rotation of the turbine blade, the vanes guide longitudinal flow to create a stable wing-tip vortex as the fluid leaves the distal end of the blade. In some such cases, this fluid-dynamic effect of the vanes is assisted by the rib, to contribute to the generation of a stable boundary layer and wing-tip vortex.

In some embodiments, the widths of the vanes vary along their axis from the leading edge to the trailing edge of the turbine blade. In some embodiments, the widths of the vanes decrease along their axis from the leading edge to the trailing edge of the turbine blade. For example, in some embodiments, at least one of the vanes has a first width at a first distance and a second width at a second, greater distance along the vane's axis from the leading edge toward the trailing edge. The first width may be greater than the second width. Referring back to FIG. 1A, vane 123a may have first width 151 at a first distance closer distance to leading edge 103 and second width 152 at a second distance closer to trailing edge 105. In accordance with some embodiments, width 151 may be greater than width 152. In some embodiments, a ratio of the first width to the second width is greater than or equal to 1.1, greater than or equal to 1.2, greater than or equal to 1.5, greater than or equal to 2, and/or up to 5, up to 10, or greater. In some embodiments, a width of at least one vane decreases monotonically along an axis of the vane from the leading edge toward the trailing edge. For example, the width of at least one vane may taper (e.g., decrease linearly) along an axis of the vane from the leading edge toward the trailing edge. It has been observed that such a decrease in width (e.g., as a taper) of some or all of the vanes from the leading edge toward the trailing edge can, in some instances, provide any of a variety of potentially advantageous fluid dynamical effects. For example, such a decrease in vane width may disrupt a boundary layer in a fluid and form a desired vortex. Such an effect may contribute, at least in part, to advantageous turbine performance (e.g., relatively low cut-in speeds, relatively high energy conversion efficiencies).

In some embodiments, at least a portion of the turbine blade is in the shape of a maple seed, also referred to as a samara. One of ordinary skill, with the benefit of this disclosure, would understand what it means for a turbine blade (or at least a portion of the turbine blade) to be in the shape of a maple seed. It should also be understood that when a portion of a turbine blade is in the shape of a maple seed, some deviation from an exact maple seed shape may be present. For example, referring again to FIG. 1A, turbine blade 100 is in the shape of a maple seed, according to some embodiments.

It has been observed in the context of the present disclosure that certain aspects of a maple seed shape, alone or in combination with each other, can contribute to any of a variety of advantages in performance of turbines comprising the turbine blade. For example, a turbine component comprising a rotor comprising a turbine blade in the shape of a maple seed may undergo rotation at a relatively low cut-in speed or have a relatively high tip-speed ratio at relatively low fluid speeds. As another example, turbine systems (e.g., hydroturbines) comprising a turbine blade in the shape of a maple seed may convert energy from the fluid relatively efficiently compared to otherwise identical turbine systems in which the turbine blade lacks a maple seed shape.

The inventors of the present disclosure have realized that principles related to maple seeds, which evolved naturally for low flow environments, may be applied to turbine blade geometries. When a maple seed drops from a tree, it freefalls for a few seconds until autorotation begins. The center of rotation of the maple seed is close to the center of gravity of the seed. During this rotation, the maple seed reaches a steady state until it hits the ground. Because of this autorotation, the wing of the maple seed generates a lift that increases the time that the maple seed spends in the air. This then increases the chances of furthering the distance between the parent tree and the maple seed. If the maple seed falling at terminal velocity experiences an upward draft of air equal to the terminal velocity, the maple seed continues to rotate in steady state. In some embodiments, some or all of these principles are applied to the turbine blades described herein.

In some embodiments in which at least a portion of the turbine blade is in the shape of a maple seed, the turbine blade comprises a root portion. It should be understood that the term root is used in this context in analogy to a maple seed, and is not to be understood to provide any particular limitation related to the connectivity of the turbine blade (e.g., with respect to other components of a turbine component such as a rotor). FIG. 1A shows turbine blade 100 in the shape of a maple seed comprising optional root portion 125, according to certain embodiments. In some embodiments, turbine blade 100 comprises optional root portion 125 and wing portion 127. FIGS. 2A-2B show front and side view schematic diagrams, respectively, of optional root portion 125 and wing portion 127 of turbine blade 100a, according to certain embodiments. In some embodiments, the proximal end of the turbine blade is an end of the root portion of the turbine blade. In certain cases, the distal end of the turbine blade is part of the wing portion of the turbine blade. In some embodiments, the root protrudes from the turbine blade. This can be seen in FIG. 2B, which shows optional root portion 125 protruding from exemplary turbine blade 100a, according to certain embodiments. In some cases, a relatively large percentage of the mass and/or volume of the turbine blade is concentrated in the root portion, resulting in a relatively high percentage of the mass of the turbine blade being within a relatively small distance from the proximal end of the turbine blade. In certain cases, having a massive root portion, results in the center of gravity of the turbine blade being relatively close to an axis of rotation of a rotor when the turbine blade is incorporated into the rotor. In some embodiments, the turbine blade has a center gravity relatively close to an interface between the root portion and the wing portion of the turbine blade. In some embodiments, the center gravity of the turbine blade is within 10%, within 5%, within 2%, within 1%, or less of the interface of the root portion and the wing portion of the turbine blade, with respect to a distance from the proximal end to the distal end of the turbine blade. As discussed above, some such mass distributions can, in certain cases, contribute to possible advantages, such as high efficiencies and/or low cut in speeds.

In some embodiments, the turbine blade comprises a root portion having an ovoid cross-section. For example, referring to FIG. 1A, in some embodiments, optional root portion 125 has an ovoid cross-section. The ovoid cross-section may, in some cases, be in a plane parallel to the thickness dimension and a lateral dimension of the turbine blade. In some embodiments, the ovoid cross-section is in a plane parallel to the thickness dimension and a longitudinal dimension of the turbine blade. FIGS. 3A-3B show exemplary such ovoid cross-sections, such as ovoid cross-section 126 in section L-L, according to certain embodiments.

In some, but not necessarily all embodiments, the turbine blade is configured to undergo autorotation in at least one fluid. For example, in some embodiments, the turbine blade is configured to undergo autorotation in water. One exemplary way in which a turbine blade may be configured to undergo autorotation is to have one or more of the mass distributions described above. One specific exemplary configuration is that in which at least a portion of the turbine blade is in the shape of a maple seed. Autorotation generally refers to a process by which fluid forces acting on an object undergoing freefall cause the object to orient itself with respect to the direction of fall. The fluid forces then cause the oriented objects to rotate in a stable, lift-generating movement where the lift opposes the direction of the fall and slows its descent. One way to test whether a turbine blade is configured to undergo autorotation in a fluid is a homogeneous mass autorotation test. A homogenous autorotation test can be performed by taking a 3D scan of the turbine blade to create a 3D model of the turbine blade, constructing a new turbine blade having the same shape as the 3D model from the scan but having a homogeneous mass density (e.g., by 3D-printing), and then releasing the homogeneous turbine blade in the fluid and evaluating whether it autorotates.

In some embodiments, one or more geometrical or structural features (e.g., longitudinal and lateral shapes, ribs, vanes), alone or in combination, contribute to the formation of fluid dynamical phenomena that may improve performance of a turbine. For example, in some embodiments, the geometrical or structural features lead to the formation a stable wing-tip vortex. The formation and maintenance of such a flow pattern may increase the efficiency of turbines in which the turbine blade is used. In some embodiments in which the turbine blade has a cross section in a longitudinal dimension and a cross-section in a lateral dimension that are in the shapes of foils, those two foils shaped planes can act in conjunction with each other to create a stable leading edge vortex. In some such embodiments where the turbine blade comprises a root portion, the root portion curves suitably towards both the foil shapes and contribute to the stable leading edge vortex as well. In some embodiments in which the turbine blade comprises a rib along at least a portion of the leading edge and vanes, the rib and vanes may, in combination, lead to the formation of a boundary layer in the fluid (e.g., water). This boundary layer may lead to the formation of a strong leading edge vortex. In some such cases, the vanes allow the vortex to travel in the longitudinal dimension to form a stable wing-tip vortex at the distal end.

Figure 7A:
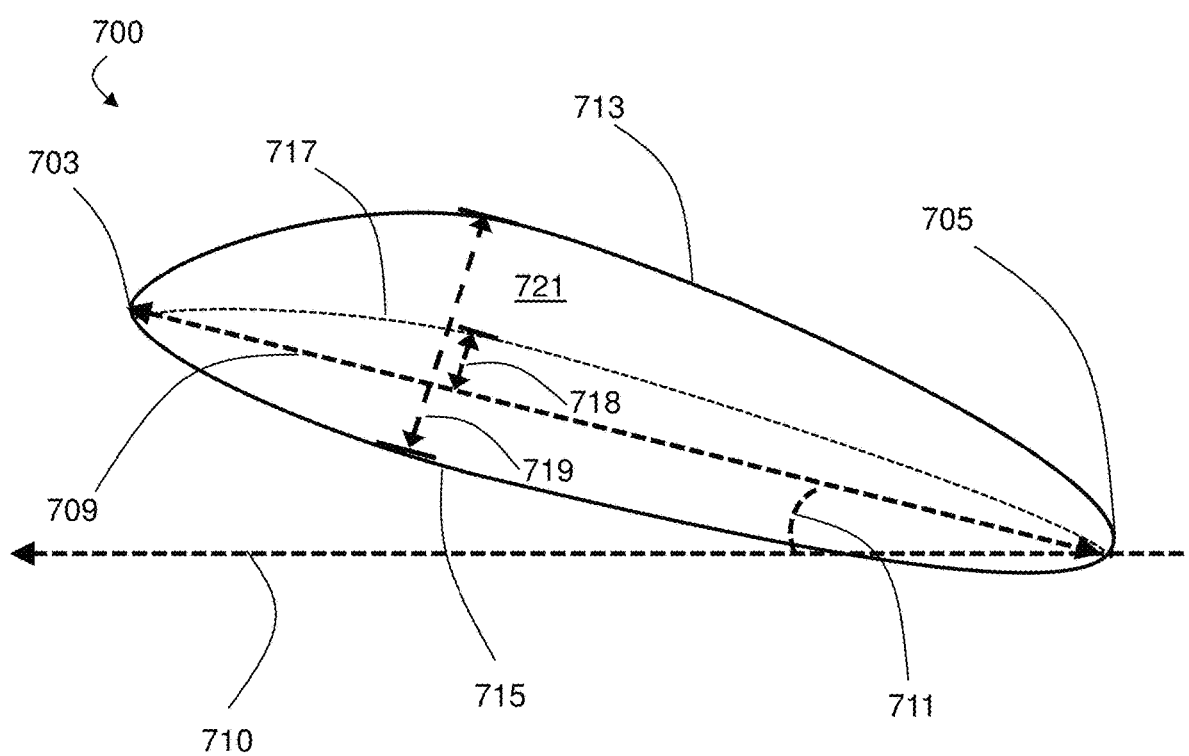
FIG. 7A shows a cross-sectional schematic diagram of an exemplary turbine blade, according to some embodiments.

In some embodiments, the turbine blade is configured such that at least a portion (e.g., at least one cross-section) of the turbine blade has a certain pitch angle or angle of attack. The pitch angle at a portion of a turbine blade in a rotor generally refers to the angle between a reference point of the rotor and a chord line of the turbine blade at that portion. For example, for an axial turbine, the pitch angle at a portion of a turbine blade refers to the angle between the plane of rotation of the rotor and a chord line of the turbine blade at that portion. FIG. 7A shows a schematic diagram of foil-shaped cross-section 700 (e.g., of a turbine blade) having leading edge 703, trailing edge 705, and chord line 709 from leading edge 703 to trailing edge 705, according to certain embodiments. As shown in FIG. 7A, in embodiments in which foil-shaped cross-section 700 is part of an axial turbine with a rotor having a plane of rotation parallel to line 710, foiled-shaped cross-section 700 has pitch angle 711. For cross-flow turbines, the pitch angle at a portion of a turbine blade refers to the angle between the plane tangent to the rotation of the leading edge and a chord line of the turbine blade at that portion. For example, referring again to FIG. 7A, a foil-shaped cross-section 700 that is part of a cross-flow turbine having a plane tangent to the rotation of leading edge 703 that is parallel to line 710 would have pitch angle 711.

The pitch angle of at least a portion of a turbine blade may have any of a variety of values, depending on the desired configuration. In some embodiments, at least a portion of the turbine blade has a pitch angle of greater than or equal to 0°, greater than or equal to 10, greater than or equal to 5° greater than or equal to 10°, greater than or equal to 20°, or greater. In some embodiments, at least a portion of the turbine blade has pitch angle of less than or equal to 45°, less than or equal to 30°, less than or equal to 25°, or less. Combinations of these ranges are possible. For example, in some embodiments, at least a portion of the turbine blade has a pitch angle of greater than or equal to 0° and less than or equal to 45°.

The angle of attack at a portion of a turbine blade, which is synonymous with the pitch angle but is used in the context of a turbine blade in operation, generally refers to the angle between the direction of motion of the turbine blade with respect to the fluid, and the chord line of the turbine blade at that portion. Referring again to FIG. 7A, in embodiments in which foil-shaped cross-section 700 has a direction of motion parallel to line 710 with respect to the fluid, foiled-shaped cross-section 700 has an angle of attack 711. The pitch angle or angle of attack may have a large effect on the lift generated by the turbine blade during rotation. For thin foils, the lift generated is generally directly proportional to the angle attack for small angles (within +/−10 degrees). The pitch angle or angle of attack may depend on the properties (e.g., density) of the fluid through which the turbine blade is configured to move. For example, the pitch angle and angle of attack of a turbine blade configured for use in a hydro-turbine (e.g., with water as a fluid) may be different than the pitch angle and angle of attack of a turbine blade configured for use in a wind turbine (e.g., with air as the fluid).

In some embodiments, turbine components described herein comprising a rotor comprising a turbine blade have certain rotor coning angles. The rotor coning angle generally refers to the angle between the longitudinal axis of the turbine blade and the plane of rotation of the rotor. As an example, rotor 200 in FIG. 2B has coning angle 129 between longitudinal axis 118 and plane of rotation 130. The coning angle of a turbine component may be greater than or equal to 0°, greater than or equal to 5°, greater than or equal to 10°, greater than or equal to 7°, greater than or equal to 20°, or greater. In some embodiments, the coning angle is less than or equal to 45°, less than or equal to 30°, less than or equal to less than or equal to 25°, or less. Combinations of these ranges are possible. For example, in some embodiments, the coning angle is greater than or equal to 0° and less than or equal to 45°.

It has been observed in the context of the present disclosure that while the coning angle of the rotor independently may not influence the rotation rate of the rotor, combinations of the coning angle and other parameters such as pitch angle can affect the performance of the rotor, such as rotations per minute, lift generated, and moment history. Therefore, in some embodiments, combinations of the pitch angle/angle of attack and coning angles can be selected based on application (e.g., laminar flow vs. turbulent flow, high torque vs. low torque, type of fluid). For example, in some embodiments in which the rotor has multiple turbine blades, a relatively high coning angle may lead to relatively good performance. In some cases, a turbine comprising a rotor comprising at least 2, at least 3, at least 4 or more turbine blades and a pitching angle of at least 5° may have relatively good performance when the coning angle is greater than or equal to 6°, greater than or equal to 7°, greater than or equal to 10°, or more. As a non-limiting example, at a pitching angle of 5° in 2 m/s water flow (flowing parallel to the axis of rotation), a coning angle of 7° may provide relatively good performance for rotors comprising three turbine blades.

As another example, in some embodiments in which the rotor has a single turbine blade, a relatively small coning angle may lead to relatively good performance. In some cases, a turbine comprising a rotor having a single turbine blade and a pitching angle of at least 5° may have relatively good performance when the coning angle is less than or equal to 5°, less than or equal to 4°, or less. As a non-limiting example, at a pitching angle of 5° in 2 m/s water flow (flowing parallel to the axis of rotation), a coning angle of 5° may provide relatively good performance for rotors having a single turbine blade.

Figure 7B:
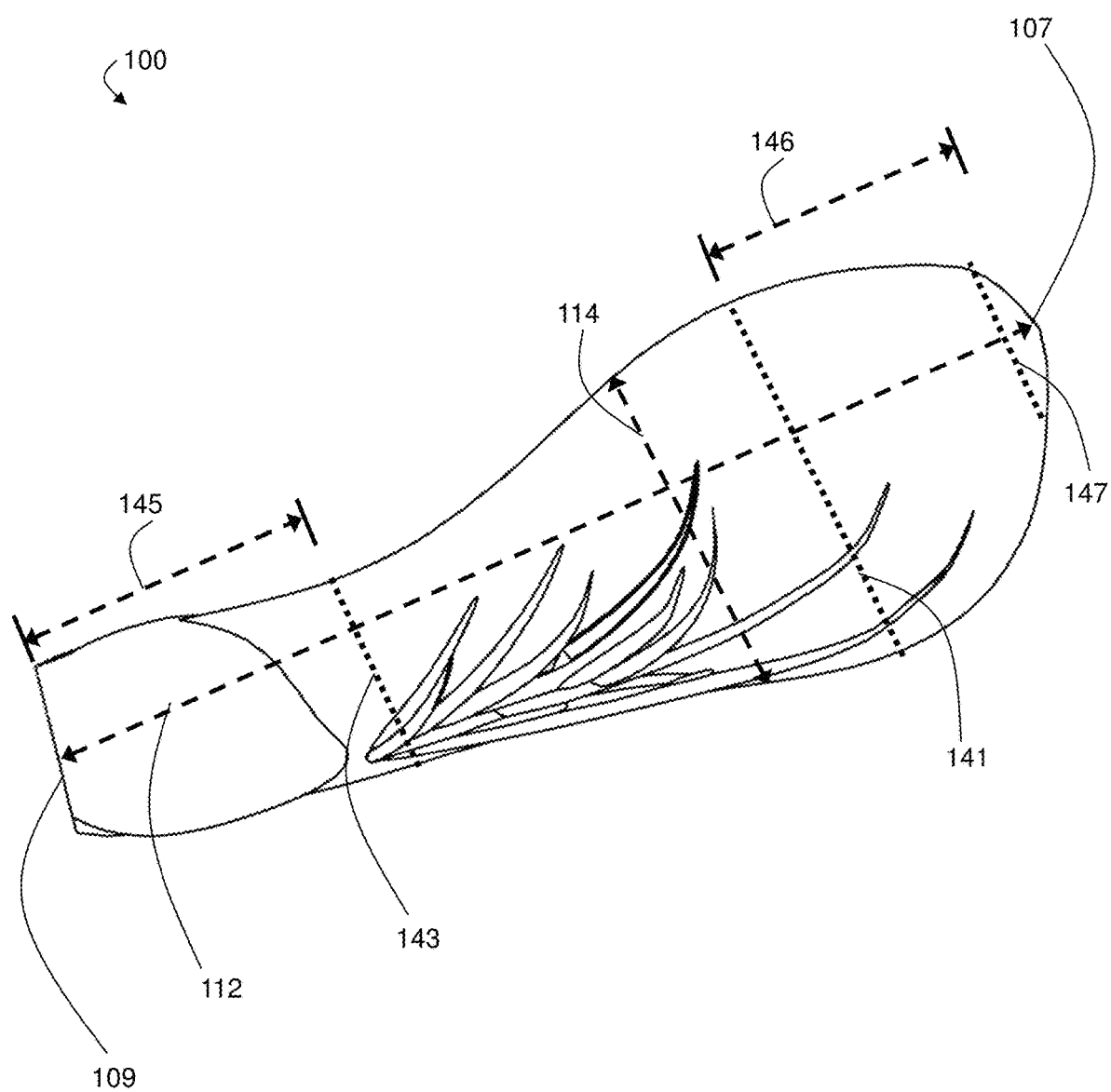
FIG. 7B shows a schematic diagram of an exemplary turbine blade, according to some embodiments.
Figure 7C:
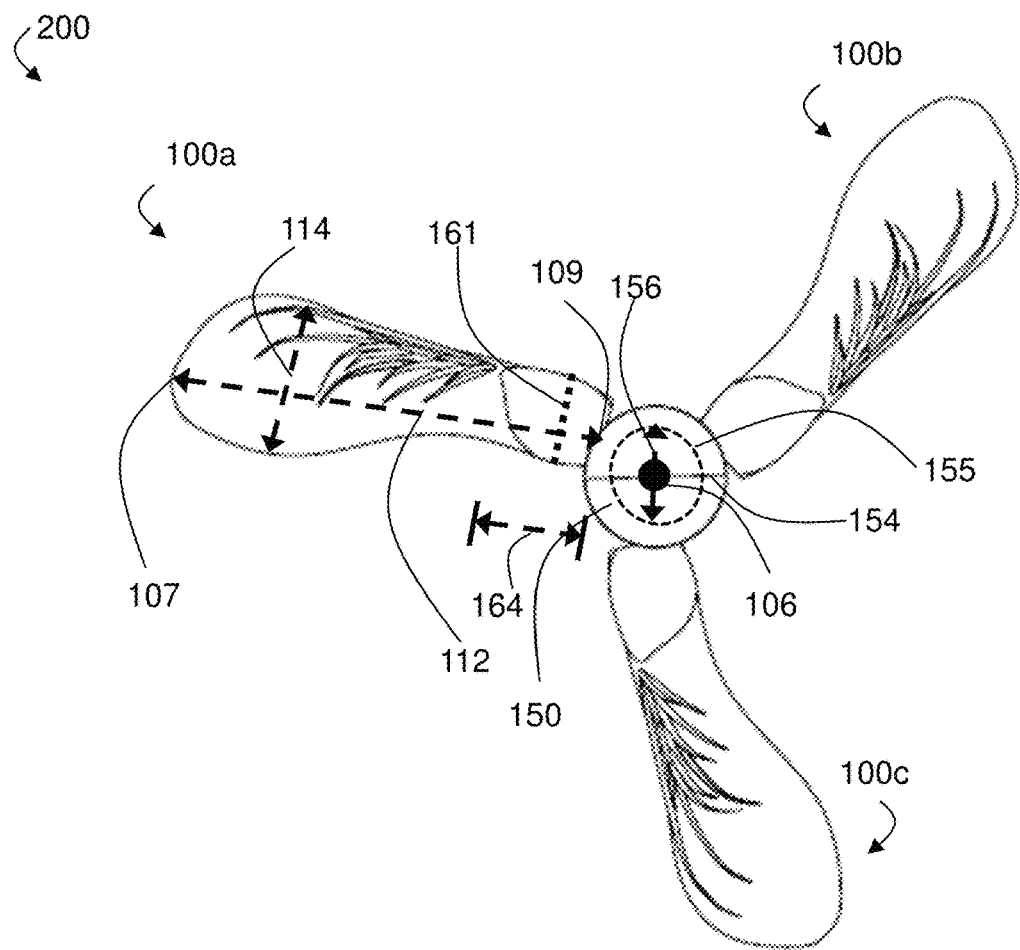
FIG. 7C shows a front view schematic diagram of an exemplary rotor comprising turbine blades, according to some embodiments.

In some embodiments, at least one cross-section, taken along a plane parallel to the thickness dimension and the longitudinal dimension, is in the shape of a cambered foil. A cambered foil is generally one in which the curvature of a top section of the foil differs from the curvature of a bottom section of the foil. For example, referring again to FIG. 7A, top section 713 of non-limiting foil-shaped cross-section 700, taken along a plane parallel to chord line 143 and the thickness dimension in FIG. 7B, has a different curvature than bottom section 715, and therefore foil-shaped cross-section 700 is cambered. The camber of a cross-section having a shape of a foil generally refers to the maximum distance between the mean camber line of the foil and the chord line of the foil. The mean camber line of a foil generally refers to the curve defined by the points halfway between the top section and the bottom section of a foil. For example, in FIG. 7A, the camber of foil-shaped cross-section 700 refers to maximum distance 718 between mean camber line 717 and chord line 709. Mean camber line 717 in FIG. 7A is defined by the points halfway between top section 713 and bottom section 715. In some embodiments, at least one cross-section, take along a plane parallel to the thickness dimension and the lateral dimension, is in the shape of a cambered foil. In some embodiments, the camber of the turbine blade varies along the longitudinal dimension of the turbine blade. For example, in FIG. 3A, the camber of cross-section 121 of section Y-Y is different than the camber of cross-section 133 of section V-V located at a different point along longitudinal dimension 112 of turbine blade 100. In some embodiments, the camber of the turbine blade varies along the lateral dimension of the turbine blade. As an example, in FIG. 3A, the camber of cross-section 119 of section B-B is different than the camber of cross-section 135 of section G-G located at a different point along lateral dimension 114 of turbine blade 100.

It has been observed in the context of the present disclosure that in low flow conditions, an increase in camber may increase the lift generated by the turbine blade. However, in some cases, a high camber can lead to an increased drag when the velocity of the incident fluid increases. In some embodiments, a suitable camber may be selected for the turbine blade based on the fluid flow velocity expected to be experienced by a turbine comprising the turbine blade. As one example, with the benefit of this disclosure, one could perform a computational fluid dynamics (CFD) analysis in which the speed of the fluid is varied while the camber is kept constant, and the results may be used to select a suitable camber. Such a process may allow for a suitable camber to be selected for above average speeds experienced by, for example, a hydroturbine comprising the turbine blade. It has also been observed that in some cases, the stall speed is lower for turbines (e.g., hydroturbines) comprising turbine blades with relatively high cambers. In some such cases, a hydroturbine with a highly cambered turbine blade (e.g., in the lateral dimension) may be well-suited for the low flow conditions that are typically available in tidal and current flows.

Figure 7D:
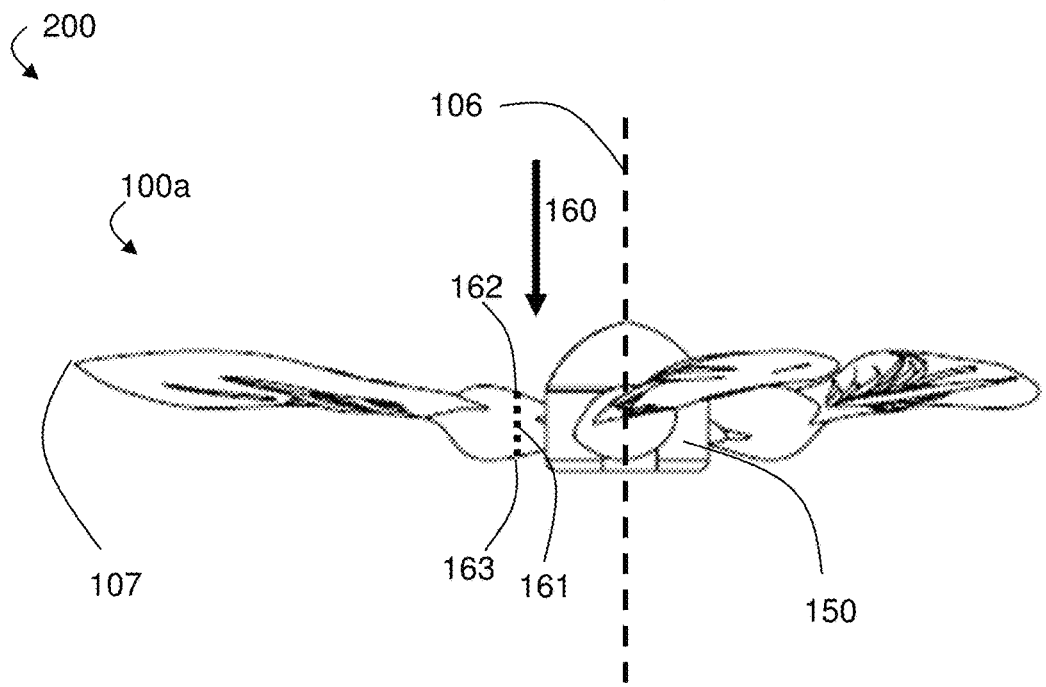
FIG. 7D shows a side view schematic diagram of an exemplary rotor comprising turbine blades, according to some embodiments.

In some embodiments, cross-sections of the turbine blade relatively close to the proximal end, taken along a plane parallel to the thickness and the lateral dimension of the turbine blade, have a positive camber. A positive camber of a cross-section in the shape of a foil of a turbine blade that is part of a rotor refers to the top section of the foil being more convex than the bottom section of the foil. In this context, the top section of a foil refers to the front-facing section of the foil with respect to the direction of motion of the fluid encountering the rotor. As an illustrative example, in FIGS. 7C-7D, turbine blade 100a of rotor 200 has cross-section 161 (represented as a dotted line), taken along a plane parallel to the thickness of turbine blade 100a and lateral dimension 114, and cross-section 161 is in the shape of a foil, in accordance with some embodiments. In operation, rotor 200 can encounter fluid having direction of motion 160 (as seen in FIG. 7D) such that section 162 of the foil of cross-section 161 is front-facing with respect to direction of motion 160 while section 163 of the foil is back-facing with respect to direction of motion 160. As such, section 162 is a top section and section 163 is a bottom section of the foil of cross-section 161. As a further illustrative point, when foil-shaped cross section 700 in FIG. 7A has top section 713 and bottom section 715 (e.g., when part of a turbine blade of a rotor), cross-section 700 is considered to have a positive camber because top section 713 is more convex than bottom section 713.

In some embodiments, a relatively high percentage of cross-sections of the turbine blade within a relatively small distance from the proximal end to the distal end of the turbine blade, taken along a plane parallel to the thickness and the lateral dimension of the turbine blade, have a positive camber. For example, in some embodiments, at least 50%, at least 75%, at least 90%, at least 95%, at least 99%, or 100% of cross-sections of the turbine blade within 10%, within 5%, within 2%, or less of a distance from the proximal end to the distal end of the turbine blade, taken along a plane parallel to the thickness and the lateral dimension of the turbine blade, have a positive camber. In some embodiments, 100% of cross-sections of the turbine blade within 5% of a distance from the proximal end to the distal end of the turbine blade, taken along a plane parallel to the thickness and the lateral dimension of the turbine blade, have a positive camber. In one such exemplary embodiment, 100% of cross-sections of turbine blade 100a within 5% of distance 112 from proximal end 109 to distal end 107 of turbine blade 100a, taken along a plane parallel to the thickness dimension and lateral dimension 114, have a positive camber, because 100% of cross-sections within distance 164 from proximal end 109 have a positive camber, and distance 164 is 5% of distance 112. Positive-cambered foils close to proximal ends of turbine blades of this disclosure may present, in some instances, any of a variety of advantages. It is believed that having a positive camber close to an axis of rotation of a turbine blade can, in some instances, promote autorotation (e.g., as is observed for maple seeds, which have positive cambers close to their centers of gravity). It has been realized that such an effect can facilitate advantageous turbine performance, such as relatively low cut-in speeds. However, in some embodiments, an axis of rotation of a rotor may not coincide with the turbine blade. For example, in axial rotors having two or more turbine blades attached to and extending from a hub, the axis of rotation of the rotor is outside the profile of the turbine blades. FIGS. 2A-2B and 7C-7D show one such embodiment, where axis of rotation 106 does not pass through any of turbine blades 100a, 100b, or 100c, but instead passes through hub 150. It has been realized that having positive cambers close to proximal ends of the turbine blades in some such embodiments such that the positive cambered foils are relatively close to the axis of rotation of the rotor can promote a similar autorotation effect even in multi-blade rotors.

In some embodiments, a relatively high percentage of cross-sections of the turbine blade, taken along a plane parallel to the thickness and the longitudinal dimension of the turbine blade, have one or more of a chord length, maximum thickness, cross-sectional area, camber, or pitch angle that is relatively different than that of a directly adjacent cross-section. The chord length of a cross-section having a shape of a foil generally refers to the distance, along the chord line, between the trailing edge and the point where the chord line intersects the leading edge. For example, in FIG. 7A, the chord length of foil-shaped cross-section 700 is equal to the distance, along chord line 709, from leading edge 703 to trailing edge 705. FIG. 7A also shows maximum thickness 719 and cross-sectional area 721 of foil-shaped cross-section 700, in accordance with certain embodiments. Referring again to FIG. 3A, the chord length, maximum thickness, cross-sectional area, camber, and pitch angle of cross-section 121 of section Y-Y are each different than the chord length, maximum thickness, cross-sectional area, camber, and pitch angle of cross-section 133 of section V-V located at a different point along longitudinal dimension 112 of turbine blade 100, in accordance with certain embodiments.

In some embodiments, at least 60%, at least 70%, at least 80%, at least 90%, at least 95%, at least 99%, or 100% of cross-sections, taken along a plane parallel to the thickness dimension and the longitudinal dimension at 1% increments across the lateral dimension, have one or more of a chord length, maximum thickness, cross-sectional area, camber, or pitch angle that is at least 0.1%, at least 0.5%, at least 1%, at least 2%, at least 5%, and/or up to 10%, or up to 20% different than that of a directly adjacent cross-section. As examples, at least 90% of cross-sections, taken along a plane parallel to the thickness dimension and the longitudinal dimension taken at 1% increments across the lateral dimension, may have a chord length that is at least 0.1% different than that of a directly adjacent cross-section. As another example, at least 60% of cross-sections, taken along a plane parallel to the thickness dimension and the longitudinal dimension taken at 1% increments across the lateral dimension, may have a chord length that is at least 1% different than that of a directly adjacent cross-section. As used herein, a percentage difference between two values is measured relative to the lower value. To illustrate, if the chord length of a first cross-section is 100 cm, and the chord length of a second cross-section directly adjacent to the first cross-section is 110 cm, that would correspond to a difference of 10% (because the difference, 10 cm, is 10% of the lower of the two chord length values, 100 cm). Having a relatively high degree of change in one or more of a chord length, maximum thickness, camber, or pitch angle among adjacent cross-sections in the longitudinal dimension may contrast with certain conventional turbine blades, which lack such a degree of variation in these parameters, and may contribute to any of a variety of advantages, such as encouraging fluidic interaction between wing-tip vortices and trailing edge vortices at the distal end.

In some embodiments, a relatively high percentage of cross-sections of the turbine blade, taken along a plane parallel to the thickness and the lateral dimension of the turbine blade, have one or more of a chord length, maximum thickness, camber, or pitch angle that is relatively different than that of a directly adjacent cross-section. Referring again to FIG. 3A, the chord length, maximum thickness, cross-sectional area, camber, and pitch angle of cross-section 119 of section C-C are each different than the chord length, maximum thickness, cross-sectional area, camber, and pitch angle of cross-section 135 of section G-G located at a different point along lateral dimension 114 of turbine blade 100, in accordance with certain embodiments.

In some embodiments, at least 90%, at least 95%, at least 99%, or 100% of cross-sections, taken along a plane parallel to the thickness dimension and the lateral dimension at 1% increments across the longitudinal dimension, have one or more of a chord length, maximum thickness, camber, or pitch angle that is at least 0.1%, at least 0.5%, at least 1%, at least 2%, at least 5%, and/or up to 10%, or up to 20% different than that of a directly adjacent cross-section. As examples, at least 90% of cross-sections, taken along a plane parallel to the thickness dimension and the lateral dimension taken at 1% increments across the longitudinal dimension, may have a chord length that is at least 0.1% different than that of a directly adjacent cross-section. As another example, at least 60% of cross-sections, taken along a plane parallel to the thickness dimension and the lateral dimension taken at 1% increments across the longitudinal dimension, may have a chord length that is at least 1% different than that of a directly adjacent cross-section. Having a relatively high degree of change in one or more of a chord length, maximum thickness, camber, or pitch angle among adjacent cross-sections in the lateral dimension may contrast with certain conventional turbine blades, which lack such a degree of variation in these parameters, and may contribute to any of a variety of advantages, such as encouraging fluidic interaction between wing-tip vortices and trailing edge vortices at the distal end.

In some embodiments, the ratio of the largest chord length and the smallest chord length on the proximal side of the largest chord length in the lateral dimension is relatively large. As used herein, a first chord is considered to be on the proximal side of a second chord if it is closer to the proximal end of the turbine blade than is the second chord. For example, referring to FIG. 7B, turbine blade 100 comprises proximal end 109 and distal end 107. Turbine blade 100 has chord line 141 and chord line 143 on the proximal side of chord 141, both of which are parallel to lateral dimension 114. Chord 143 is on the proximal side of chord 141 because chord 143 is closer to proximal end 109 than is chord 141. Chord line 141 has the largest chord length of turbine 100, and chord line 143 is the chord on the proximal side of chord line 141 having the shortest chord length, according to certain embodiments. In some embodiments, the ratio between the chord lengths of chord line 141 and chord line 143 is relatively large. As can be seen in exemplary turbine blade 100 in FIG. 7B, chord lengths parallel to lateral dimension 114 that are relatively close to proximal end 109, such as chord length 143, are relatively small, but as the lateral chord lengths approach distal end 107 along longitudinal dimension 112, the chord lengths increase to a maximum chord length (largest chord length 143), at which point the chord lengths begin decreasing again (e.g., as shown with chord length 147) until the tip of turbine blade 100 is reached at distal end 107, according to certain embodiments.

Without wishing to be bound by any particular theory, it is believed that turbine blade geometries having a ratio between the largest chord length and the smallest chord length on the proximal side of the largest chord length in the lateral dimension that is greater than 1.0 can in some cases result in the turbine blade generating a relatively large amount of lift during rotation. The larger chord length being closer to the distal end (tip) of the turbine blade causes greater lift to be generated near the distal relative to the proximal end, which can create a moment on the blade in addition to the lift, resulting in a more efficient turbine in certain cases. In some embodiments, the ratio of the largest chord and the smallest chord on the proximal side of the largest chord length in the lateral dimension is greater than or equal to 1.1, greater than or equal to 1.3, greater than or equal to 1.5, greater than or equal to 1.6, greater than or equal to 1.7, and/or less than or equal to 1.8, less than or equal to 1.9, or less than or equal to 2.0.

In some embodiments, at least a portion of the turbine blade is be twisted along the longitudinal dimension of the turbine blade. For example, referring to FIG. 1A, in some embodiments, turbine blade 100 is twisted along longitudinal dimension 112. In some cases, a portion of a turbine blade that is twisted along a longitudinal dimension has a first cross-section, taken along a plane perpendicular to the longitudinal dimension, that has a first chord line, and a second cross-section, taken along a plane perpendicular to the longitudinal dimension, that has a second chord line that is not coplanar with the first chord line. Referring again to FIG. 7B, in some embodiments, turbine 100 is twisted, and chord line 141 (a first chord line) and chord line 143 (a second chord line) each lie in a plane perpendicular to longitudinal dimension 112, and chord line 141 and chord line 143 are not coplanar. In some cases, the first chord line is in the proximal 50% of the turbine blade and the second chord line is in the distal 50% of the turbine blade, and the first chord line and second chord line are not co-planar. For example, in FIG. 7B, chord line 143 is in the proximal 50% of turbine blade 100 because chord line 143 is within a distance 145 of proximal end 109, and distance 145 is within 50% of the distance from proximal end 109 to distal end 107. Similarly, in FIG. 7B, chord line 141 is in the distal 50% of turbine blade 100 because chord line 141 is within a distance 146 of distal end 107, and distance 146 is within 50% of the distance from distal end 107 to proximal end 109. In some embodiments, the first chord line is in the proximal 25%, proximal 10%, proximal 5%, or proximal 1% of the turbine blade, the second chord line is in the distal 25%, distal 10%, distal 5%, or distal 1% of the turbine blade, and the first chord line and the second chord line are not co-planar. In some embodiments, the angle of intersection between the plane defined by the first chord line and the longitudinal dimension (e.g., a plane defined by chord 141 and longitudinal dimension 112) and the plane defined by the second chord line (e.g., the plane defined by chord 143 and longitudinal dimension 112) is at least 1°, at least 2°, at least 5°, at least 10°, at least 20°, and/or up to 30°, up to 45° up to 60°, or up to 90°.

A turbine blade being twisted along the longitudinal dimension may result in the pitch angle of the turbine blade varying along the longitudinal dimension, as described above. Adjusting the pitch angle (and angle of attack) along the longitudinal dimension can, in some cases, provide for any of a variety of advantages. For example, varying the pitch angle (e.g., by twisting the turbine blade) may allow for one to account for variations in angular components of velocity of incident fluid along the longitudinal dimension during rotation. In some embodiments, a turbine blade being twisted along the longitudinal dimension results in a better distribution of lift forces along the longitudinal dimension of the turbine blade relative to turbine blades lacking such a twist.

In some embodiments, one or more components described herein (e.g., turbine blade, turbine component, rotor) are part of a turbine system. The turbine system may be configured to convert mechanical energy from a moving fluid (e.g., water, air) to a different form of energy, such as electrical energy. In some embodiments, the turbine system is part of a hydroturbine. That is, in some embodiments, the fluid to which the turbine system is exposed and from which the turbine system converts energy is water. In certain embodiments however, the turbine system is a part of a wind turbine. When the turbine system is a part of a wind turbine, the fluid to which the turbine system is exposed and from which the converts energy is air. Whether the turbine system is a part of a hydroturbine or a part of a wind turbine may determine certain characteristics or parameters of the turbine blade and/or rotor, such as rotor diameter, pitch angle, coning angle, material used for turbine blade, or mass/volume distribution. The turbine blade may be made from any of a variety of suitable materials. The material may be selected based on, for example, the type of turbine into which it is incorporated and/or the type of fluid from which it will convert energy. All or part of the turbine blade may be made of, for example, a metal and/or metal alloy. In some embodiments, the turbine blade is made of aluminum, steel, or alloys thereof. In some cases, the turbine blade is made of a polymeric material, such as nylon. In some embodiments, the turbine blade is made of a composite material, such as carbon fiber. In some instances, the turbine blade is a composite of any of the above materials in combination (e.g., a fiber-reinforced metal-based blade, or a blade comprising layers or domains of different materials). The turbine blade may comprise an anti-fouling coating that, in some cases, can protect at least a portion of a surface of the turbine blade.

Figure 8:
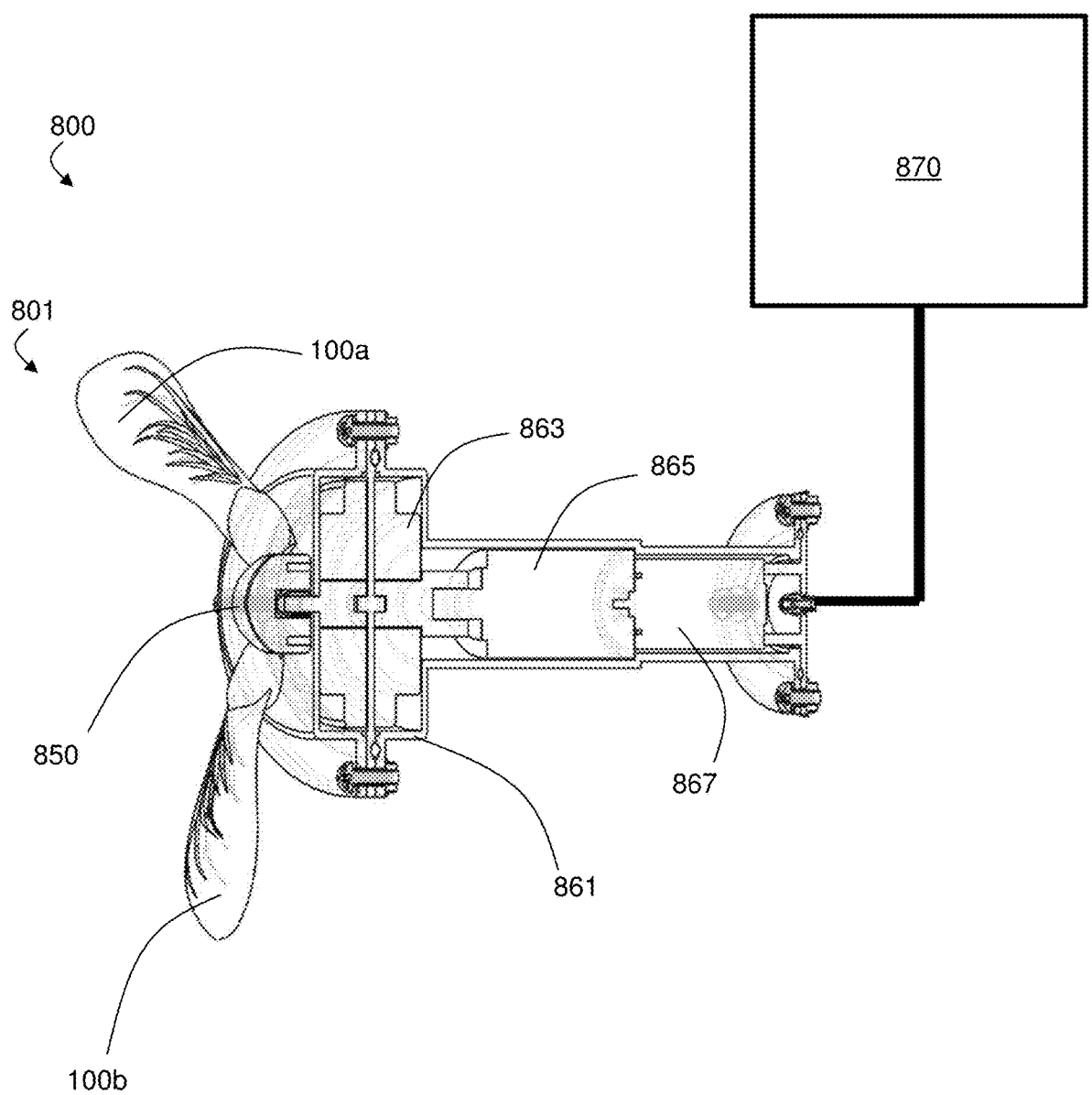
FIG. 8 shows side view cross-sectional schematic diagram of an exemplary turbine system, according to certain embodiments.

FIG. 8 shows a cross-sectional schematic diagram of exemplary turbine system 800, according to certain embodiments. Exemplary turbine system 800 comprises rotor 801 comprising turbine blades 100*a*, 100*b*, and 100*c* extending from hub 850. The turbine system may comprise components configured to facilitate the conversion of energy from the motion of the rotor to, for example, electrical energy. For example, the turbine system may comprise a shaft that transfers rotational work from the rotor to a mechanical subsystem contained in a nacelle. In some embodiments, the mechanical subsystem is part of the turbine system, while in certain embodiments the mechanical subsystem is located in the different location. For example, in some embodiments in which the turbine system is part of a hydroturbine, the mechanical subsystem is located above the surface of the water. In some embodiments, the mechanical system comprises a belt or drive chain. The mechanical subsystem may include a bearing, gearbox, and a generator. In certain cases, a nacelle also comprises an electrical subsystem. For example, a nacelle may comprise a transformer and a controller, a bearing in a sealed chamber, as well as in magnetic coupling, a gearbox, and a generator. In FIG. 8, exemplary turbine system 800 is configured such that rotor 801 is coupled to bearing 863 in sealed chamber 861, according to certain embodiments. Turbine system 800 further comprises magnetic coupling and reduction gearbox 865 and generator 867, according to certain embodiments.

In some embodiments, the turbine system comprises an anchor point. The anchor point may be used to fix the position of the hydroturbine. For example, in FIG. 8, turbine system 800 comprises anchor point 870, which can be used to fix the position of hydroturbine system 800. In certain cases, the anchor point is the ground. For example, in some instances in which the turbine system is a hydroturbine, the anchor point is the ground or seabed below the hydroturbine. In some embodiments, the anchor point is buoyant. For example, in some instances in which the turbine system is a hydroturbine, the anchor point is buoyant (e.g., the anchor point is or comprises a raft, a buoy, a ship) such that it can float in the water above the hydroturbine. In some embodiments, the anchor point is anchored to the ground. For example, in some embodiments, the turbine system is a hydroturbine and the anchor point is anchored to the ground (e.g., the anchor point is or comprises a bridge, a crane, a dam, a pier, a wharf, or a jetty).

The anchor point of the turbine system, when present, can be connected to other components of the turbine system in any of a variety of ways. In some embodiments, one or more components of the turbine system are connected to the anchor point via a mechanically stiff or rigid structure. For example, in some embodiments, one or more components of the turbine system are connected to the anchor point via a mast, a tower, or a boom. In certain cases, one or more components of the turbine system are tethered to the anchor point.

U.S. Provisional Application No. 62/939,242, filed Nov. 22, 2019, and entitled "Turbines and Associated Components, Systems, and Methods," is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A turbine component, comprising:
  a turbine blade configured to be incorporated into a rotor of a turbine, the turbine blade comprising:
    a distal end; and
    a proximal end closer to an axis of rotation of the rotor than the distal end when the turbine blade is incorporated into the rotor;
  wherein the turbine blade has a longitudinal dimension extending from the proximal end to the distal end;
  wherein the turbine blade is configured such that, when incorporated into the rotor, fluid flow along the longitudinal dimension induces rotation of the rotor; and
  wherein at least 35% of the mass and/or volume of the turbine blade is within 25% of a distance from the proximal end to the distal end of the turbine blade.

2. The turbine component of claim 1, wherein the turbine blade has a thickness dimension, and wherein the turbine blade has at least one cross-section, taken along a plane parallel to the thickness dimension and the longitudinal dimension, that is in the shape of a foil.

3. The turbine component of claim 2, wherein the turbine blade has a lateral dimension perpendicular to the thickness dimension and the longitudinal dimension, and wherein the turbine blade has at least one cross-section, taken along a plane parallel to the thickness dimension and the lateral dimension, that is in the shape of a second foil.

4. The turbine component of claim 1, wherein the turbine blade has a thickness dimension and a lateral dimension perpendicular to the thickness dimension and the longitudinal dimension, and wherein the turbine blade has at least one cross-section, taken along a plane parallel to the thickness dimension and the lateral dimension, that is in the shape of a foil.

5. The turbine component of claim 1, wherein the turbine blade has a thickness dimension and a lateral dimension perpendicular to the thickness dimension and the longitudinal dimension, and wherein the turbine blade is configured such that, when incorporated into the rotor, fluid flow along the lateral dimension induces rotation of the rotor.

6. The turbine component of claim 1, wherein the turbine blade has a thickness dimension and a lateral dimension perpendicular to the thickness dimension and the longitudinal dimension, and wherein at least 90% of cross-sections, taken along a plane parallel to the thickness dimension and the longitudinal dimension at 1% increments across the lateral dimension are in the shape of a foil.

7. The turbine component of claim 1, wherein the turbine blade has a thickness dimension and a lateral dimension perpendicular to the thickness dimension and the longitudinal dimension, and wherein at least 90% of cross-sections, taken along a plane parallel to the thickness dimension and the lateral dimension at 1% increments across the longitudinal dimension are in the shape of a foil.

8. The turbine component of claim 1, wherein the turbine blade is incorporated into the rotor.

9. The turbine component of claim 8, wherein the rotor comprises a hub, and wherein the hub is hollow.

10. The turbine component of claim 8, wherein the rotor comprises a hub having an exterior surface, and wherein less than or equal to 90% of a volume bound by the exterior surface of the hub is occupied by solid material.

11. The turbine component of claim 8, wherein the rotor comprises a hub, and wherein the turbine blade is attached to and extends from the hub.

12. The turbine component of claim 8, wherein the turbine component is a part of a hydroturbine.

13. The turbine component of claim 1, wherein the turbine blade comprises a leading edge and a rib along at least a portion of the leading edge.

14. The turbine component of claim 1, wherein the turbine blade comprises a leading edge, a trailing edge, and a vane extending from the leading edge to the trailing edge.

15. The turbine component of claim 14, wherein the vane has a first width at a first distance and a second width at a second, greater distance along an axis of the vane from the leading edge toward the trailing edge, wherein the first width is greater than the second width.

16. The turbine component of claim 14, wherein a width of the vane decreases monotonically along an axis of the vane from the leading edge toward the trailing edge.

17. The turbine component of claim 1, wherein at least a portion of the turbine blade is in the shape of a maple seed.

18. The turbine component of claim 1, wherein the turbine blade is configured to undergo autorotation in at least one fluid.

19. The turbine component of claim 1, wherein the turbine blade has a thickness dimension and a lateral dimension perpendicular to the thickness dimension and the longitudinal dimension, and wherein at least 90% of cross-sections, taken along a plane parallel to the thickness dimension and the lateral dimension at 1% increments across the longitudinal dimension, have one or more of a chord length, maximum thickness, camber, or pitch angle that is at least 0.1% different than that of a directly adjacent cross-section.

20. The turbine component of claim 1, wherein the turbine blade has a thickness dimension and a lateral dimension perpendicular to the thickness dimension and the longitudinal dimension, and wherein at least 90 of cross-sections, taken along a plane parallel to the thickness dimension and the longitudinal dimension at 1% increments across the lateral dimension, have one or more of a chord length, maximum thickness, camber, or pitch angle that is at least 0.1% different than that of a directly adjacent cross-section.

21. The turbine component of claim 1, wherein the turbine blade has a thickness dimension and a lateral dimension perpendicular to the thickness dimension and the longitudinal dimension, and wherein at least 50% of cross-sections of the turbine blade within 10% of a distance from the proximal end to the distal end of the turbine blade, taken along a plane parallel to the thickness dimension and the lateral dimension of the turbine blade, have a positive camber.

22. The turbine component of claim 1, wherein the turbine blade has a thickness dimension and a lateral dimension perpendicular to the thickness dimension and the longitudinal dimension, and wherein a ratio of a largest chord and a smallest chord on a proximal side of the largest chord in the lateral dimension is greater than or equal to 1.1.

23. The turbine component of claim 1, wherein the turbine component is a part of a hydroturbine.

24. The turbine component of claim 1, wherein the turbine component is a part of a wind turbine.

25. A method, comprising exposing the turbine component of claim 1 to a fluid.

26. The method of claim 25, wherein the fluid is water.

27. The turbine component of claim 1, wherein at least 35% of the mass of the turbine blade is within 25% of a distance from the proximal end to the distal end of the turbine blade.

28. The turbine component of claim 1, wherein at least 35% of the volume of the turbine blade is within 25% of a distance from the proximal end to the distal end of the turbine blade.

29. The turbine component of claim 1, wherein at least 60% of the mass of the turbine blade is within 50% of a distance from the proximal end to the distal end of the turbine blade.

30. The turbine component of claim 1, wherein at least 60% of the mass and/or volume of the turbine blade is within 50% of a distance from the proximal end to the distal end of the turbine blade.

31. The turbine component of claim 1, wherein the turbine blade is a first turbine blade, wherein the first turbine blade and a second turbine blade are incorporated into the rotor, wherein the second turbine blade comprises a distal end and a proximal end closer to an axis of rotation of the rotor than the distal end, and wherein the first turbine blade and the second turbine blade each comprises:
- a longitudinal axis passing through the proximal end and the distal end; and
- a center of gravity within 45% of a distance along the longitudinal axis from the axis of rotation of the rotor to the distal end of the turbine blade.

32. The turbine component of claim 1, wherein the fluid flow is water flow.

33. The turbine component of claim 1, wherein the turbine blade has a root portion having an ovoid cross-section.

34. A turbine component, comprising:
a turbine blade configured to be incorporated into a rotor of a turbine, the turbine blade comprising:
- a distal end; and
- a proximal end closer to an axis of rotation of the rotor than the distal end when the turbine blade is incorporated into the rotor;

wherein the turbine blade has a thickness dimension, a longitudinal dimension extending from the proximal end to the distal end, and a lateral dimension perpendicular to the thickness dimension and the longitudinal dimension;

wherein the turbine blade is configured such that, when incorporated into the rotor, fluid flow along the longitudinal dimension induces rotation of the rotor; and wherein at least 90% of cross-sections, taken along a plane parallel to the thickness dimension and the lateral dimension at 1% increments across the longitudinal dimension, have one or more of a chord length, maximum thickness, camber, or pitch angle that is at least 0.1% different than that of a directly adjacent cross-section.

35. The turbine component of claim 34, wherein at least 90% of cross-sections, taken along a plane parallel to the thickness dimension and the lateral dimension at 1% increments across the longitudinal dimension, have a chord length that is at least 0.1% different than that of a directly adjacent cross-section.

36. The turbine component of claim 34, wherein at least 90% of cross-sections, taken along a plane parallel to the thickness dimension and the lateral dimension at 1% increments across the longitudinal dimension, have a maximum thickness that is at least 0.1% different than that of a directly adjacent cross-section.

37. The turbine component of claim 34, wherein at least 90% of cross-sections, taken along a plane parallel to the thickness dimension and the lateral dimension at 1% increments across the longitudinal dimension, have a camber that is at least 0.1% different than that of a directly adjacent cross-section.

38. The turbine component of claim 34, wherein at least 90% of cross-sections, taken along a plane parallel to the thickness dimension and the lateral dimension at 1% increments across the longitudinal dimension, have a pitch angle that is at least 0.1% different than that of a directly adjacent cross-section.

39. The turbine component of claim 34, wherein at least 90% of cross-sections, taken along a plane parallel to the thickness dimension and the longitudinal dimension at 1% increments across the lateral dimension, have one or more of a chord length, maximum thickness, camber, or pitch angle that is at least 0.1% different than that of a directly adjacent cross-section.

40. The turbine component of claim 34, wherein the turbine blade is configured such that, when incorporated into the rotor, fluid flow along the lateral dimension induces rotation of the rotor.

41. The turbine component of claim 34, wherein the turbine blade is incorporated into the rotor.

42. The turbine component of claim 41, wherein the rotor comprises a hub, and wherein the turbine blade is attached to and extends from the hub.

43. The turbine component of claim 41, wherein the turbine component is a part of a hydroturbine.

44. The turbine component of claim 34, wherein the turbine blade comprises a leading edge and a rib along at least a portion of the leading edge.

45. The turbine component of claim 34, wherein the turbine blade comprises a leading edge, a trailing edge, and a vane extending from the leading edge to the trailing edge.

46. The turbine component of claim 34, wherein the turbine blade comprises a ratio of a largest chord and a smallest chord on a proximal side of the largest chord in the lateral dimension that is greater than or equal to 1.1.

47. The turbine component of claim 34, wherein the turbine component is a part of a hydroturbine.

48. The turbine component of claim 34, wherein at least 60% of the mass of the turbine blade is within 50% of a distance from the proximal end to the distal end of the turbine blade.

49. The turbine component of claim 34, wherein at least 60% of the volume of the turbine blade is within 50% of a distance from the proximal end to the distal end of the turbine blade.

50. The turbine component of claim 34, wherein the turbine blade is a first turbine blade, wherein the first turbine blade and a second turbine blade are incorporated into the rotor, wherein the second turbine blade comprises a distal end and a proximal end closer to an axis of rotation of the rotor than the distal end, and wherein the first turbine blade and the second turbine blade each comprises:
 a longitudinal axis passing through the proximal end and the distal end; and
 a center of gravity within 45% of a distance along the longitudinal axis from the axis of rotation of the rotor to the distal end of the turbine blade.

51. The turbine component of claim 34, wherein the turbine blade is in the shape of a maple seed.

52. The turbine component of claim 34, wherein the turbine blade has a root portion having an ovoid cross-section.

53. The turbine component of claim 34, wherein the fluid flow is a water flow.

54. A method, comprising exposing the turbine component of claim 34 to water.

55. A turbine component, comprising:
 a turbine blade configured to be incorporated into a rotor of a turbine, the turbine blade comprising:
  a distal end; and
  a proximal end closer to an axis of rotation of the rotor than the distal end when the turbine blade is incorporated into the rotor;
 wherein the turbine blade has a thickness dimension, a longitudinal dimension extending from the proximal end to the distal end, and a lateral dimension perpendicular to the thickness dimension and the longitudinal dimension;
 wherein the turbine blade is configured such that, when incorporated into the rotor, fluid flow along the longitudinal dimension induces rotation of the rotor; and
 wherein at least 90% of cross-sections, taken along a plane parallel to the thickness dimension and the longitudinal dimension at 1% increments across the lateral dimension, have one or more of a chord length, maximum thickness, camber, or pitch angle that is at least 0.1% different than that of a directly adjacent cross-section.

56. The turbine component of claim 55, wherein at least 90% of cross-sections, taken along a plane parallel to the thickness dimension and the longitudinal dimension at 1% increments across the lateral dimension, have a chord length that is at least 0.1% different than that of a directly adjacent cross-section.

57. The turbine component of claim 55, wherein at least 90% of cross-sections, taken along a plane parallel to the thickness dimension and the longitudinal dimension at 1% increments across the lateral dimension, have a maximum thickness that is at least 0.1% different than that of a directly adjacent cross-section.

58. The turbine component of claim 55, wherein at least 90% of cross-sections, taken along a plane parallel to the thickness dimension and the longitudinal dimension at 1% increments across the lateral dimension, have a camber that is at least 0.1% different than that of a directly adjacent cross-section.

59. The turbine component of claim 55, wherein at least 90% of cross-sections, taken along a plane parallel to the thickness dimension and the longitudinal dimension at 1% increments across the lateral dimension, have a pitch angle that is at least 0.1% different than that of a directly adjacent cross-section.

60. The turbine component of claim 55, wherein the turbine blade is configured such that, when incorporated into the rotor, fluid flow along the lateral dimension induces rotation of the rotor.

61. The turbine component of claim 55, wherein the turbine blade is incorporated into the rotor.

62. The turbine component of claim 61, wherein the rotor comprises a hub, and wherein the turbine blade is attached to and extends from the hub.

63. The turbine component of claim 61, wherein the turbine component is a part of a hydroturbine.

64. The turbine component of claim 55, wherein the turbine blade comprises a leading edge and a rib along at least a portion of the leading edge.

65. The turbine component of claim 55, wherein the turbine blade comprises a leading edge, a trailing edge, and a vane extending from the leading edge to the trailing edge.

66. The turbine component of claim 55, wherein the turbine blade comprises a ratio of a largest chord and a smallest chord on a proximal side of the largest chord in the lateral dimension that is greater than or equal to 1.1.

67. The turbine component of claim 55, wherein the turbine component is a part of a hydroturbine.

68. The turbine component of claim 55, wherein at least 60% of the mass of the turbine blade is within 50% of a distance from the proximal end to the distal end of the turbine blade.

69. The turbine component of claim 55, wherein at least 60% of the volume of the turbine blade is within 50% of a distance from the proximal end to the distal end of the turbine blade.

70. The turbine component of claim 55, wherein the turbine blade is a first turbine blade, wherein the first turbine blade and a second turbine blade are incorporated into the rotor, wherein the second turbine blade comprises a distal end and a proximal end closer to an axis of rotation of the rotor than the distal end, and wherein the first turbine blade and the second turbine blade each comprises:
 a longitudinal axis passing through the proximal end and the distal end; and
 a center of gravity within 45% of a distance along the longitudinal axis from the axis of rotation of the rotor to the distal end of the turbine blade.

71. The turbine component of claim 55, wherein the turbine blade is in the shape of a maple seed.

72. The turbine component of claim 55, wherein the turbine blade has a root portion having an ovoid cross-section.

73. The turbine component of claim 55, wherein the fluid flow is water flow.

74. A method, comprising exposing the turbine component of claim 55 to water.

\* \* \* \* \*

UNITED STATES PATENT AND TRADEMARK OFFICE
CERTIFICATE OF CORRECTION

PATENT NO. : 11,371,355 B2
APPLICATION NO. : 17/394730
DATED : June 28, 2022
INVENTOR(S) : Prakash Narayan Govindan et al.

Page 1 of 1

It is certified that error appears in the above-identified patent and that said Letters Patent is hereby corrected as shown below:

In the Specification

At Column 15, Line 25, "as low as 10," should read --as low as 1°,--

At Column 20, Line 57, "greater than or equal to 10," should read --greater than or equal to 1°,--

In the Claims

In Claim 6, Line 7, "lateral dimension are in the shape of a foil." should read --lateral dimension, are in the shape of a foil.--

In Claim 7, Line 7, "dimension are in the shape of a foil." should read --dimension, are in the shape of a foil.--

In Claim 20, Line 4, "at least 90 of cross-sections," should read --at least 90% of cross-sections,--

In Claim 53, Line 2, "flow is a water flow." should read --flow is water flow.--

Signed and Sealed this
Fourth Day of October, 2022

Katherine Kelly Vidal
*Director of the United States Patent and Trademark Office*